United States Patent
Leddy et al.

(10) Patent No.: US 8,231,988 B2
(45) Date of Patent: Jul. 31, 2012

(54) BATTERIES AND BATTERY COMPONENTS WITH MAGNETICALLY MODIFIED MANGANESE DIOXIDE

(75) Inventors: Johna Leddy, Iowa City, IA (US); Joseph Tesene, Coralville, IA (US)

(73) Assignee: University of Iowa Research Foundation, Iowa City, IA (US)

( * ) Notice: Subject to any disclaimer, the term of this patent is extended or adjusted under 35 U.S.C. 154(b) by 0 days.

(21) Appl. No.: 11/350,252

(22) Filed: Feb. 8, 2006

(65) Prior Publication Data

US 2007/0009771 A1  Jan. 11, 2007

Related U.S. Application Data

(60) Provisional application No. 60/651,539, filed on Feb. 9, 2005, provisional application No. 60/699,666, filed on Jul. 15, 2005.

(51) Int. Cl.
| | |
|---|---|
| H01M 2/00 | (2006.01) |
| H01M 6/00 | (2006.01) |
| H01M 10/00 | (2006.01) |
| H01M 4/13 | (2010.01) |

(52) U.S. Cl. .......... 429/10; 429/224; 429/122; 29/623.1
(58) Field of Classification Search .......... 429/10, 429/129, 244, 217, 229, 122, 224, 206, 208–209, 429/218.1, 232–233; 252/182.1; 29/623.1, 29/623.3–623.5; 427/127
See application file for complete search history.

(56) References Cited

U.S. PATENT DOCUMENTS

| | | | |
|---|---|---|---|
| 5,162,169 A | | 11/1992 | Tomantschger et al. |
| 5,215,854 A | * | 6/1993 | Yamazaki et al. ........ 430/137.11 |
| 5,489,493 A | | 2/1996 | Urry |
| 5,505,823 A | | 4/1996 | Rendall |
| 5,599,644 A | * | 2/1997 | Swierbut et al. ............... 429/224 |
| 5,704,118 A | | 1/1998 | Kaneko et al. |
| 5,728,482 A | * | 3/1998 | Kawakami et al. ............. 429/10 |
| 5,817,221 A | | 10/1998 | Leddy et al. |
| 5,869,200 A | | 2/1999 | Nunnally |
| 6,143,446 A | * | 11/2000 | Davis et al. ................... 429/224 |
| 6,207,313 B1 | | 3/2001 | Leddy et al. |
| 6,207,322 B1 | | 3/2001 | Kelsey et al. |
| 6,355,166 B1 | | 3/2002 | Amarasinghe et al. |
| 6,372,401 B1 | * | 4/2002 | Matsuzaki et al. ........ 430/111.35 |
| 6,444,364 B1 | | 9/2002 | Harris et al. |
| 6,512,909 B2 | * | 1/2003 | Ozawa et al. ................. 399/270 |
| 6,521,377 B2 | | 2/2003 | Ogasawara et al. |

(Continued)

FOREIGN PATENT DOCUMENTS

JP  61158931 A  *  7/1986

OTHER PUBLICATIONS

Principal Dry Battery Systems, Typical Characteristics, Energizer, 2004; 4 pages.

(Continued)

Primary Examiner — Barbara Gilliam
Assistant Examiner — Claire L Roe
(74) Attorney, Agent, or Firm — Foley & Lardner LLP

(57) ABSTRACT

Battery electrodes with desirable discharge performance comprise manganese oxide and magnetic particles. Corresponding power cells have improved specific discharge capacities. Furthermore, magnetically modified manganese dioxide electrodes are found to have significantly improved cycling properties that suggest the possibility for improved performance in secondary batteries.

29 Claims, 23 Drawing Sheets

U.S. PATENT DOCUMENTS

| | | | |
|---|---|---|---|
| 6,551,742 B1 * | 4/2003 | Huq et al. | 429/176 |
| 6,855,241 B2 | 2/2005 | Palmer | |
| 6,890,670 B2 | 5/2005 | Leddy et al. | |
| 6,932,846 B2 * | 8/2005 | Bowden et al. | 29/623.1 |
| 2002/0134964 A1 * | 9/2002 | Christian et al. | 252/182.1 |
| 2003/0165744 A1 * | 9/2003 | Schubert et al. | 429/303 |
| 2003/0232223 A1 * | 12/2003 | Leddy et al. | 429/10 |
| 2004/0009400 A1 | 1/2004 | Yamaguchi | |
| 2004/0023110 A1 * | 2/2004 | Parent et al. | 429/206 |
| 2004/0026253 A1 | 2/2004 | Leddy et al. | |
| 2004/0137283 A1 | 7/2004 | Leddy et al. | |
| 2004/0248007 A1 | 12/2004 | Tamakoshi | |
| 2006/0083694 A1 * | 4/2006 | Kodas et al. | 424/46 |
| 2007/0056849 A1 | 3/2007 | Leddy et al. | |

OTHER PUBLICATIONS

Energizer Cylindrical Alkaline, Application Manual, Eveready Battery Co., Inc., 2001; 11 pages.

Energizer A95 Product Datasheet, Energizer Holdings, Inc., undated; 1 page.

Typical Energizer Battery Cross Section, Alkaline—'AA', Energizer, undated; 1 page.

PCT/US06/04624, filed Feb. 9, 2006, International Search Report, mailed May 29, 2008 (10 pages).

PCT/US06/04624, filed Feb. 9, 2006, International Preliminary Report on Patentability (5 pages).

* cited by examiner

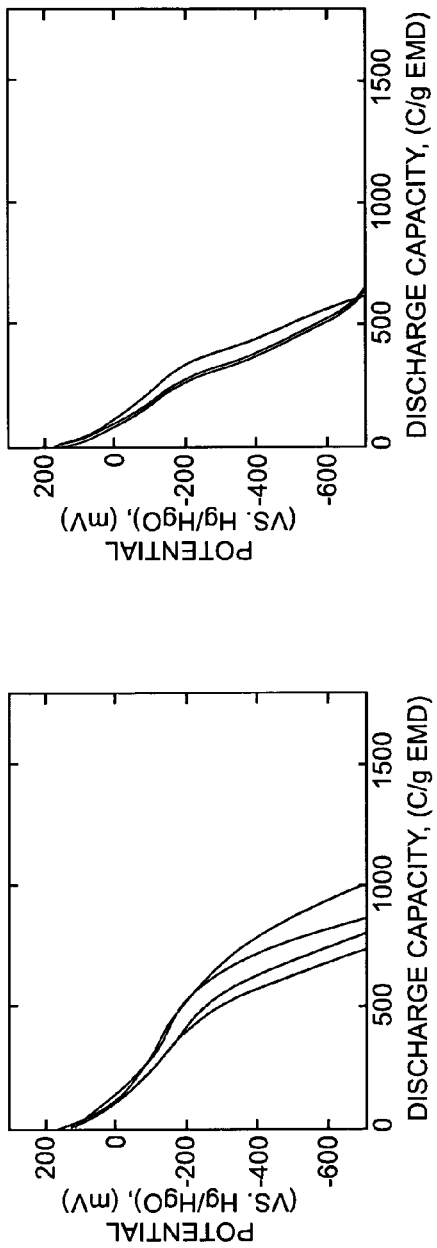
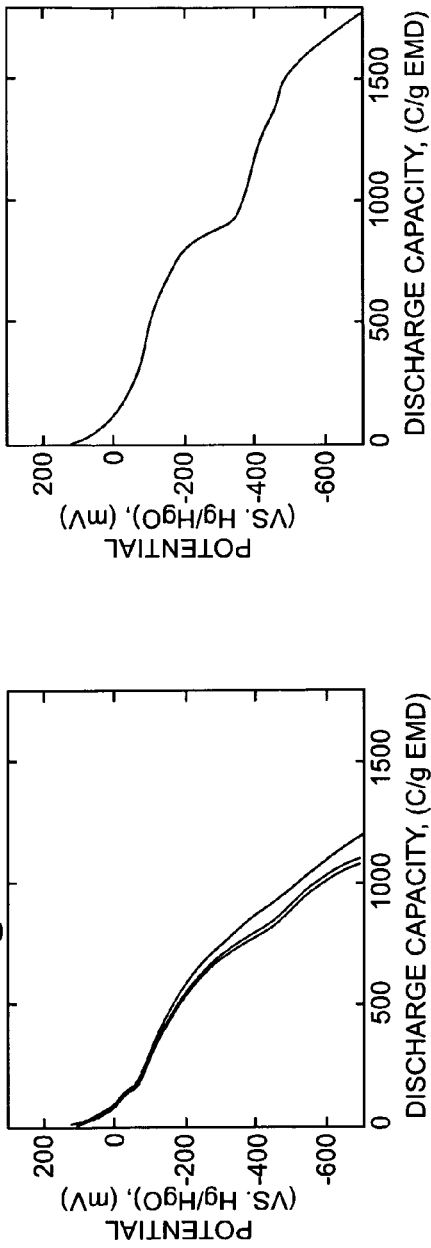
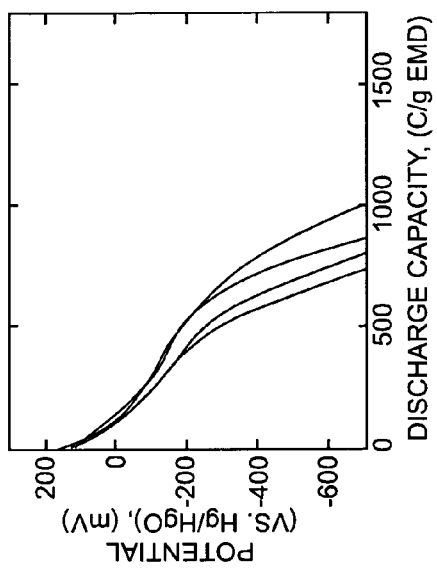
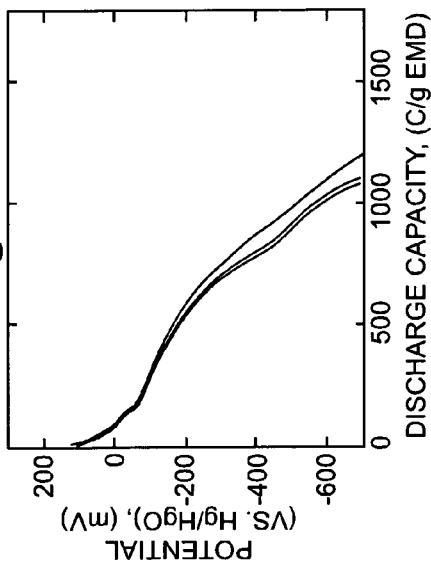
Fig. 8a
Fig. 8b
Fig. 8c
Fig. 8d

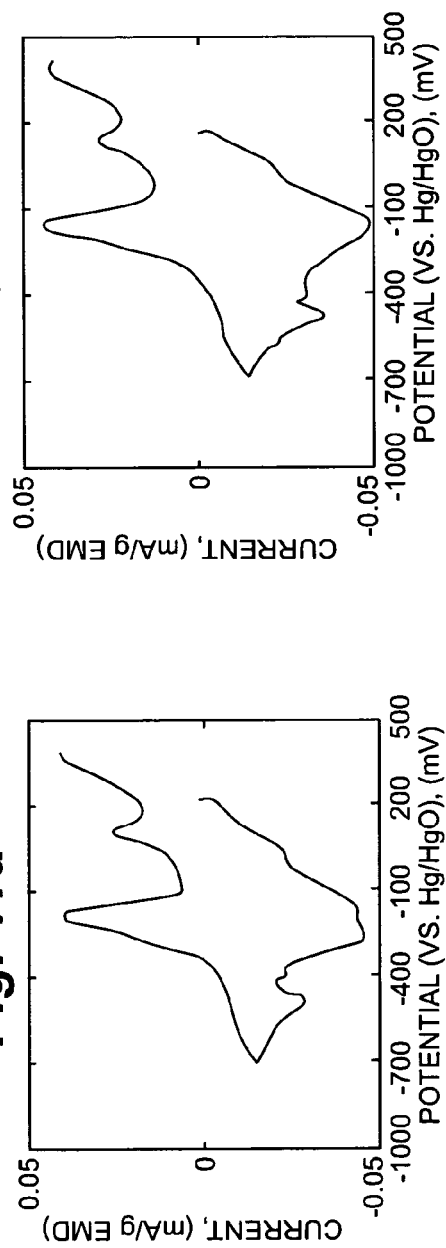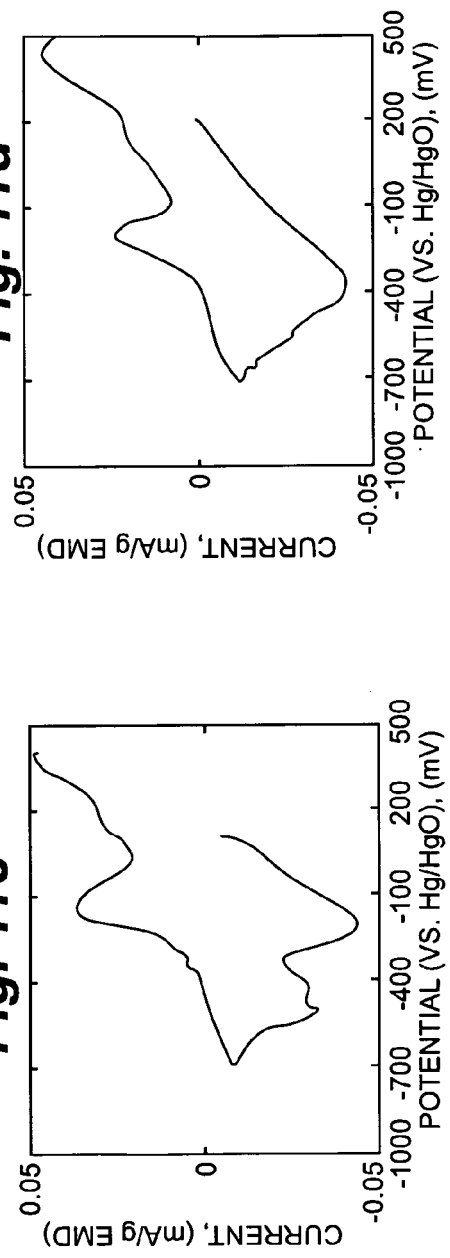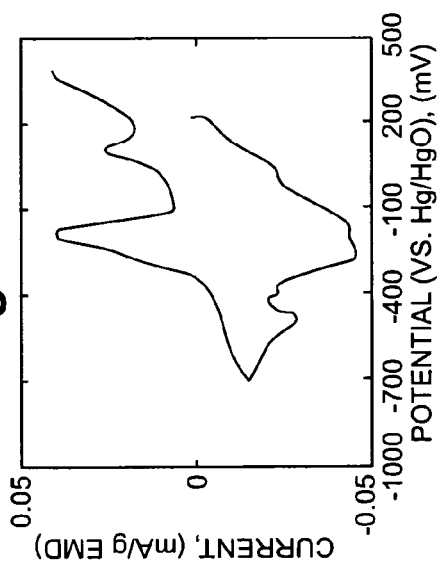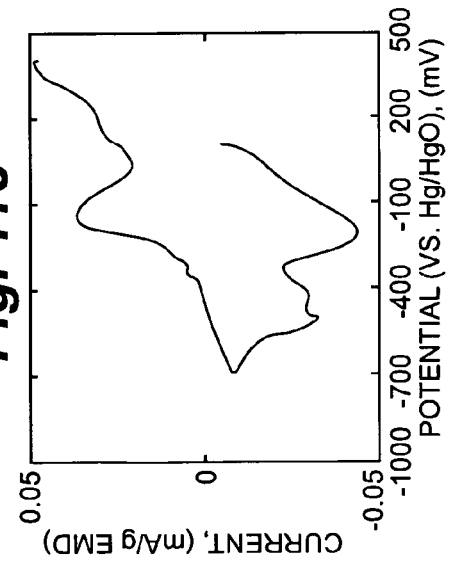

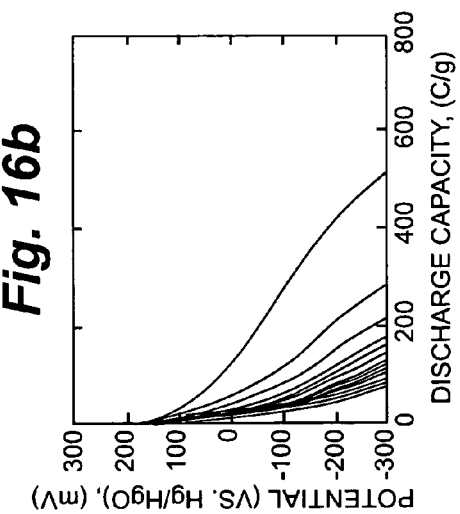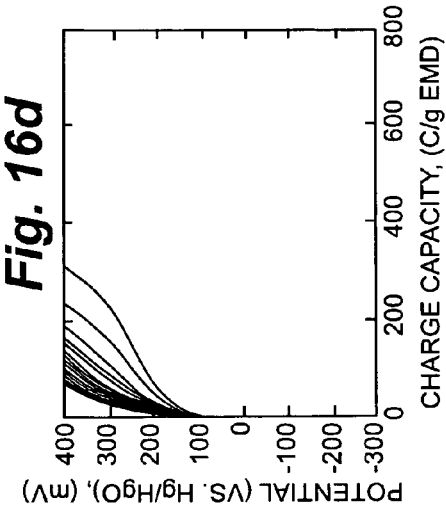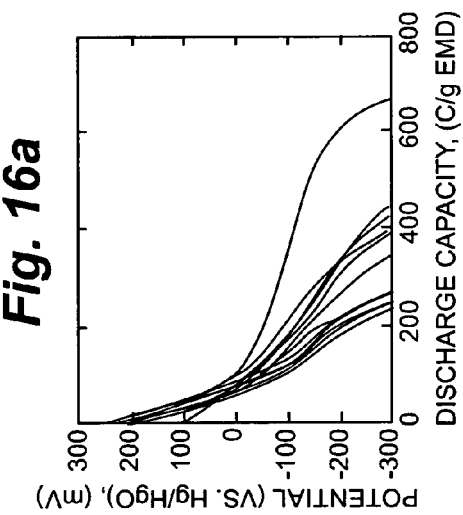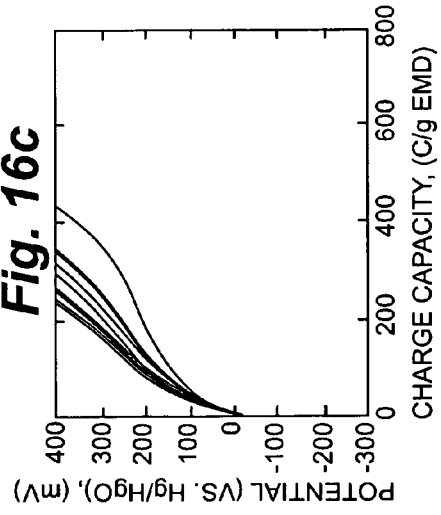

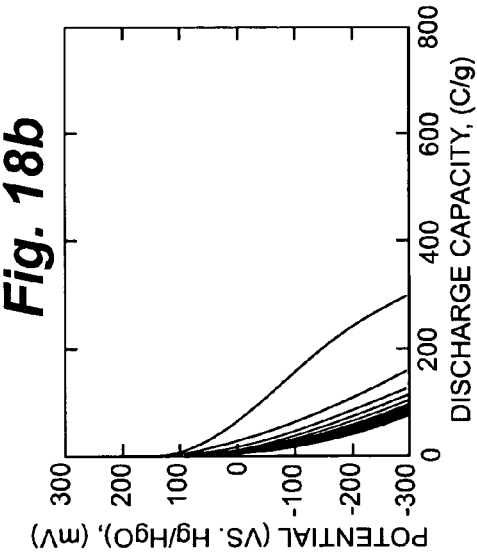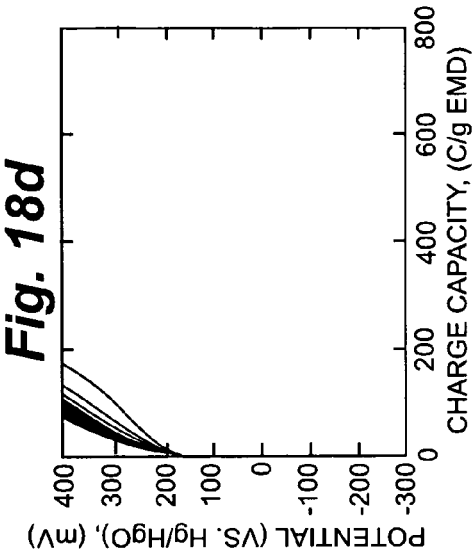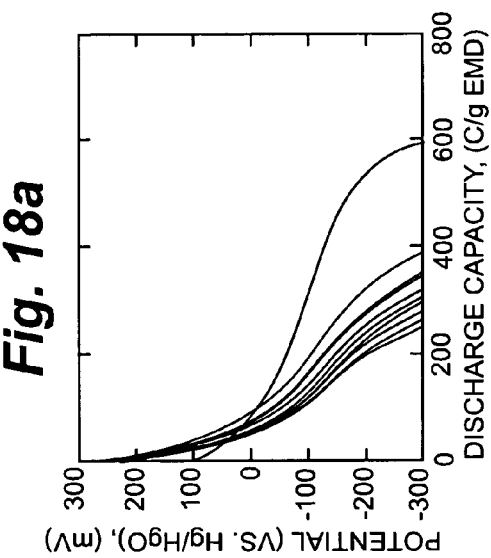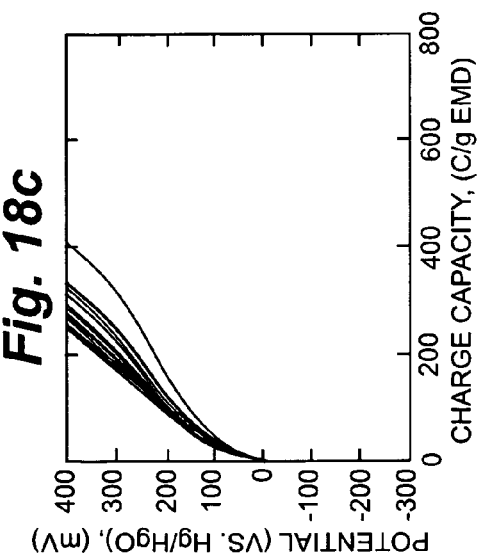

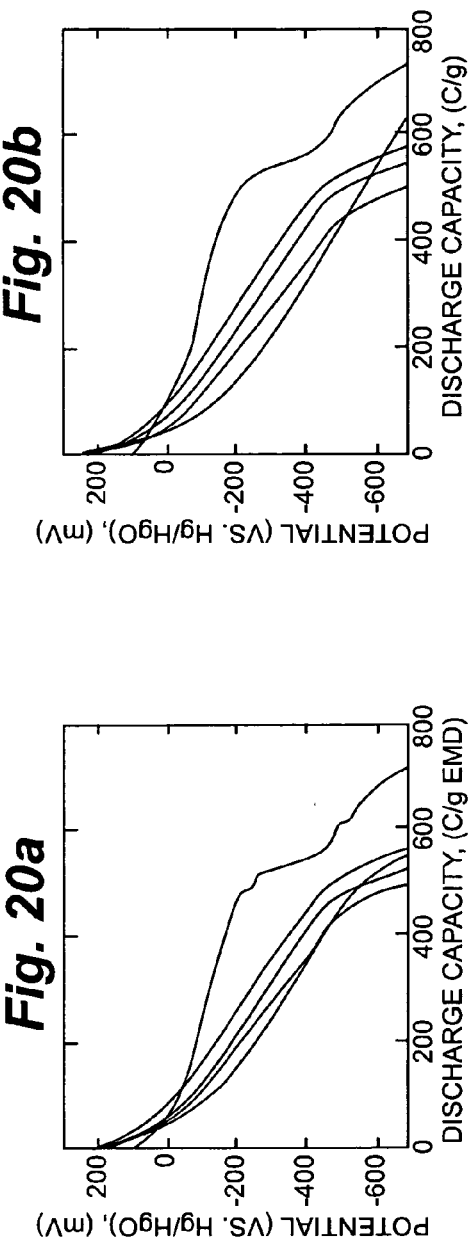
Fig. 20a
Fig. 20b
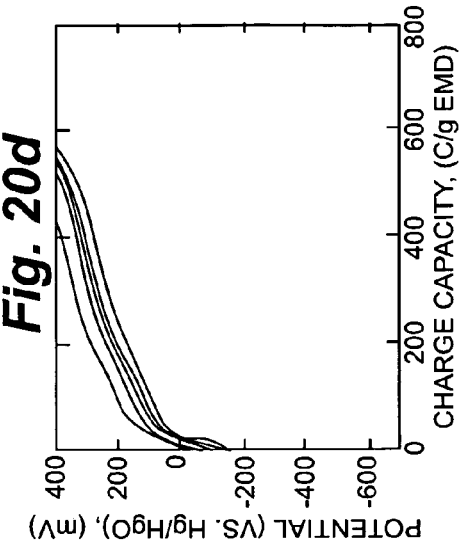
Fig. 20c
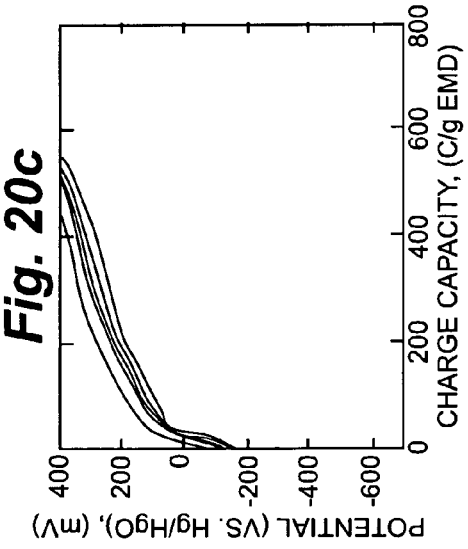
Fig. 20d

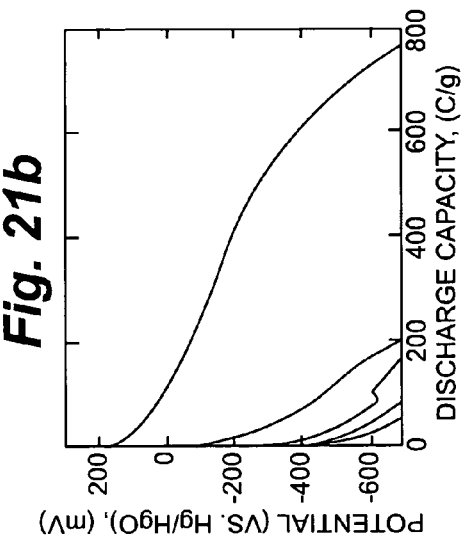
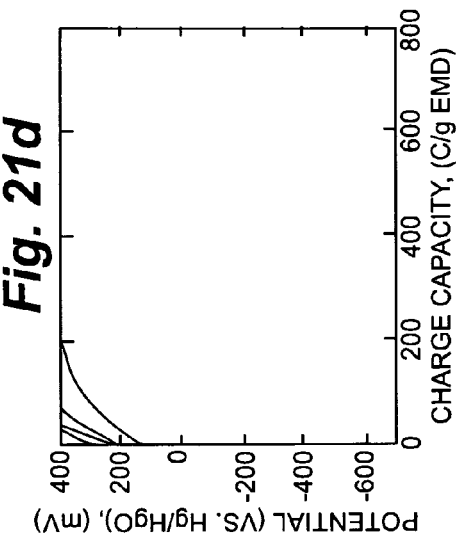
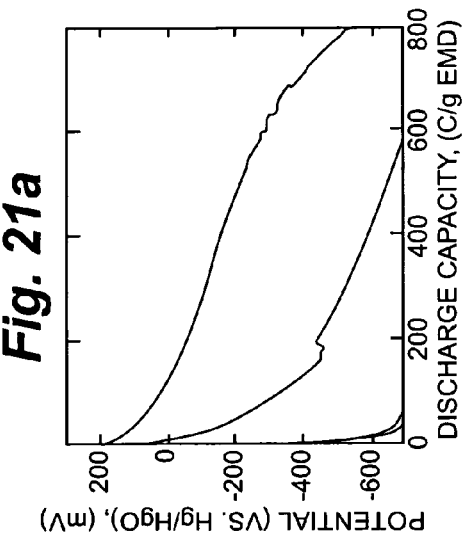
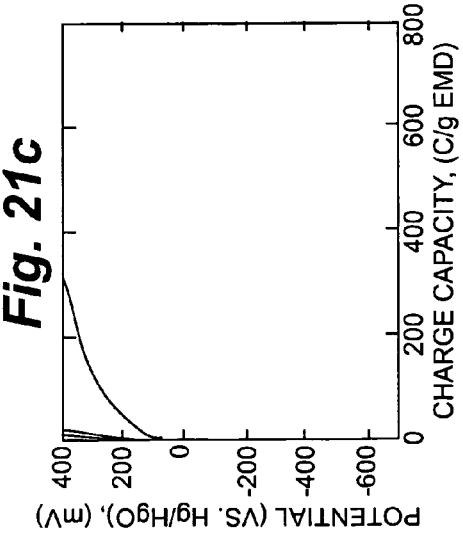

BATTERIES AND BATTERY COMPONENTS WITH MAGNETICALLY MODIFIED MANGANESE DIOXIDE

RELATED APPLICATIONS

The present application claims priority to U.S. Provisional Application No. 60/651,539 entitled "Magnetically Modified Electrolytic Manganese Dioxide," filed Feb. 9, 2005 and U.S. Provisional Application No. 60/699,666 entitled "Alkaline Batteries with Magnetic Particles," filed Jul. 15, 2005, both of which are incorporated herein in their entirety by reference.

FIELD OF THE INVENTION

The invention relates to power cells, such as zinc-manganese dioxide power cells, and power cell electrodes. The invention further relates to methods for forming power cell electrodes having increased discharge capacity and significantly improved cycling properties in a secondary cell.

BACKGROUND OF THE INVENTION

Zinc/manganese dioxide ($Zn/MnO_2$) power cells are widely used in the primary (disposable) battery market. Such power cells include alkaline, LeClanche, and zinc chloride power cells. The positive electrode of zinc/manganese dioxide batteries generally comprises a manganese dioxide ($MnO_2$) component, graphite, and other additives, such as polymer binders. A specific form of manganese dioxide that is prepared from the electrolysis of hot $MnSO_4$ at a graphite, titanium, or lead alloy anode is electrolytic manganese dioxide (EMD).

The cell capacity directly relates to the lifetime of the cell or the time until a secondary (rechargeable) cell needs recharging. To be commercially viable, a secondary cell should cycle a reasonable number of times before the capacity of the cell drops below acceptable values. To meet ever increasing demands on portable power cells, there is market pressure to increase the volume capacity of portable power cells.

SUMMARY OF THE INVENTION

By including magnetic particles in manganese dioxide cell positive electrodes, desirable power cell performance can be obtained. Such power cells include alkaline, LeClanche, and zinc chloride power cells. In primary cells, the manganese dioxide within an electrode loaded with magnetic particles can exhibit significantly higher power and increased discharge capacity. In secondary cells, a significant improvement in the cycling behavior can provide the basis for commercially suitable rechargeable secondary manganese dioxide battery cells.

In a first aspect, the invention pertains to a power cell electrode having manganese dioxide, such as electrolytic $MnO_2$, and magnetic particles exhibiting high power and a high discharge capacity. The magnetic particles can comprise between about 0.5 and 50 weight percent of the electrode. In some embodiments, the magnetic particles can comprise between about 1 and 25 weight percent of the electrode. The magnetic particles can be selected from the group consisting of $Sm_2Co_{17}$, $SmCo_5$, NdFeB, $Sm_2Co_7$, $La_{0.9}Sm_{0.1}Ni_2Co_3$, $Ti_{0.51}Zr_{0.49}V_{0.70}Ni_{1.18}Cr_{0.12}$, $Fe_3O_4$, $Fe_2O_3$, and any combination thereof. The electrode can comprise between about 25 to about 99 weight percent manganese dioxide. While relatively broad ranges of magnetizable materials are contemplated, reasonably low amounts of magnetic particles can provide substantial improvements in electrode performance.

In further aspects, the electrode can comprise electrically conductive particles selected from the group consisting of: graphite, carbon black, metal powders, and any combinations thereof. The electrically conductive particles can comprise between about 1 and about 35 weight percent of the electrode. In some embodiments, the electrically conductive particles can comprise between about 2 and about 15 weight percent of the electrode. The electrode can comprise a polymeric binder for combining the manganese dioxide and magnetic particles. The polymeric binder can be selected from the group consisting of: polytetrafluoroethylene, polyethylene oxide, and any combinations thereof and can comprise up to about 15 weight percent of the electrode.

The electrode can have a first cycle discharge capacity of a homogeneous phase $1e/1H^+$ reduction that is at least 1.1 times that for a comparable electrode not comprising magnetic material. Also, the electrode can have a first cycle discharge capacity of a $2e/2H^+$ reduction that is at least 1.2 times that for a comparable electrode not comprising magnetic material.

In another aspect, the invention pertains to a battery comprising a negative electrode, a positive electrode, a separator between the negative electrode and the positive electrode, and an electrolyte in contact with the electrodes, wherein the positive electrode comprises manganese dioxide and magnetic particles. The battery can comprise a sealed case. In some embodiments, the electrodes and separator are wound within the sealed case. The negative electrode can comprise elemental zinc, which can comprise a zinc alloy, such as brass, and can further comprise a powder bound with a polymer gelling agent. The electrolyte can comprise potassium hydroxide and the separator can comprise a porous sheet, such as an ion conducting polymer sheet. In other embodiments, the sheet can comprise any suitable porous material, such as a paper sheet.

In other aspects, the invention pertains to an electrode comprising at least about 50 weight percent manganese dioxide wherein the electrode in contact with an electrolyte having a discharge capacity at the tenth cycle of at least about 250 coulombs per gram discharged to −300 millivolts measured relative to a Hg/HgO standard reference electrode.

In further aspects, the invention pertains to a manganese dioxide cell comprising a cathode comprising manganese dioxide, an anode, and an aqueous alkaline electrolyte, wherein the cathode has a discharge capacity of at least about 1150 $Cg^{-1}$ until a potential of the cathode reaches −700 mV relative to a Hg/HgO standard. In some aspects, the cathode has a discharge capacity of at least about 1150 $Cg^{-1}$ when the specific discharge capacity is evaluated at a discharge rate of 33⅓ $mAg^{-1}$. In some aspects, the cathode has a specific discharge capacity of at least about 1300 $Cg^{-1}$ until a potential of the cathode reaches −700 mV relative to a Hg/HgO standard.

In another aspect, the invention pertains to a manganese dioxide cell comprising a cathode comprising magnetized manganese dioxide, an anode, a separator between the anode and the cathode, and electrolyte in contact with the electrodes.

Moreover, the invention pertains to a method for forming a battery electrode comprising combining manganese dioxide particles and magnetic particles. The manganese dioxide particles and magnetic particles can be combined with a binder.

BRIEF DESCRIPTION OF THE DRAWINGS

FIGS. 8(a)-(d) are primary discharge curves for electrodes formed with 10% vol/vol graphite: (a) Untreated EMD, (b) $TiO_2$-treated EMD, (c) $SmCo_5$-treated EMD, (d) $Sm_2Co_{17}$-treated EMD.

FIGS. 11(a)-(d) are CV plots for (a) Untreated EMD, (b) $SmCo_5$-Treated EMD, (c) $Sm_2Co_{17}$-Treated EMD, and (d) $Sm_2Co_{17}$-Pretreated EMD.

FIGS. 16(a)-(d) are primary discharge curves for EMD composite electrodes (lowest discharge potential "$E_{LOW}$"=−300 mV): (a) Discharge of $Sm_2Co_{17}$-Treated EMD, (b) Discharge of Untreated EMD, (c) Charge of $Sm_2Co_{17}$-Treated EMD, (d) Charge of Untreated EMD.

FIGS. 18(a)-(d) are primary discharge curves for EMD composite electrodes ($E_{LOW}$=−300 mV): (a) Discharge of $Sm_2Co_{17}$-Treated EMD, (b) Discharge of $TiO_2$-Treated EMD, (c) Charge of $Sm_2Co_{17}$-Treated EMD, (d) Charge of $TiO_2$-Treated EMD.

FIGS. 20(a)-(d) are primary discharge cycle curves for replicate $Sm_2Co_{17}$-Treated EMD electrodes, wherein the upper tiles (a, b) depict discharge segments and the lower tiles (c, d) depict corresponding charge segments.

FIGS. 21(a)-(d) are secondary discharge cycle curves for replicate untreated EMD electrodes, wherein the upper tiles (a, b) depict discharge segments and the lower tiles (c, d) depict corresponding charge segments.

DETAILED DESCRIPTION OF THE INVENTION

Figure 1:
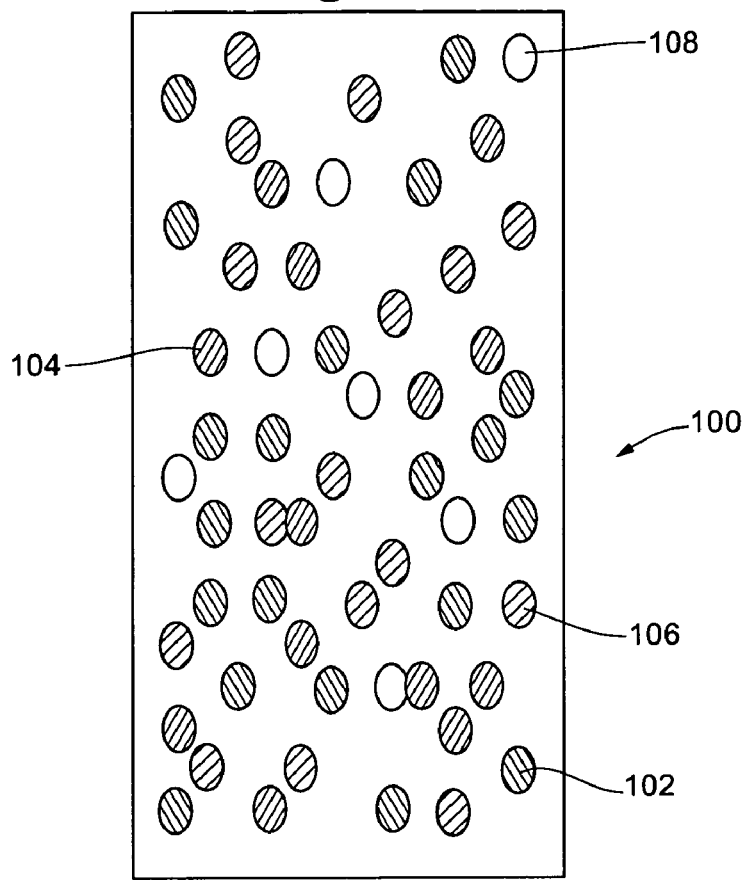
FIG. 1 is a schematic view of a magnetically modified manganese dioxide electrode.

Desirable power cell performance can be obtained through the inclusion of magnetic particles in electrochemical cell cathodes using manganese dioxide in the cathode. In general, any suitable anode can be used in these cells, such as zinc or cadmium. For primary cells, the manganese dioxide within an electrode loaded with magnetic particles is observed to exhibit significantly higher power and increased discharge capacity. For secondary cells, significant improvement in the cycling behavior is observed, which can provide the basis for commercially suitable rechargeable secondary manganese dioxide-based batteries. These electrodes incorporating magnetically modified manganese dioxide can be assembled into various commercial cells to increase the battery power, discharge capacity and/or improve the cycling properties of secondary batteries.

The manganese in manganese dioxide has an initial oxidation state of +4. This material can undergo relevant stages of reduction reactions in an aqueous solution, such as KOH (alkaline cell), ammonium chloride and zinc chloride (LeClanche cell), or zinc chloride (zinc chloride cell). Due to the reduction, the oxide sequentially becomes a hydroxide. A corresponding oxidation reaction takes place at the negative electrode. During discharge of the cell, the positive electrode functions as a cathode at which the reduction reactions take place. For a secondary cell, during recharging of the cell, the positive electrode is the location of oxidation of the manganese back to its original oxidation state.

Magnetizable particles can be incorporated into electrochemical electrodes to influence the properties, especially the electrochemistry, of an electrolytic species. Rate effects on electrode chemistry is described further in U.S. Pat. No. 6,890,670 to Leddy et al., entitled "Magnetically Modified Electrodes as Well as Methods of Making and Using the Same," which is incorporated herein by reference. The particular interest here is on the chemistry of manganese dioxide. Magnetic materials are materials that develop a stable magnetic moment following exposure to a strong magnetic field for a sufficient period of time. Examples of magnetic materials include, for example, permanent magnetic materials, ferromagnetic materials, ferrimagnetic materials, superconducting materials and combinations thereof.

Generally, the magnetic particles are blended with the electrolytic manganese dioxide within the electrode structure, although configurations can be used in which the magnetic particles are near but in separate sections of the electrode structure. The magnetizable materials are generally in the form of particles that can be incorporated into an electrode with a binder. However, the binder is optional since in certain embodiments the active electrode materials can be packed into an electrode structure without the need for a binder to provide mechanical stability. Prior to performing the electrochemistry, if not prior to incorporation into the electrode, magnetizable particles can be magnetized to have a stable magnetic moment during the electrochemical reactions.

Results obtained on the electrochemistry of manganese dioxide indicate that the presence of the magnetic particles influences the crystal structure of the reduced form on the $MnO_2$. This ability to influence the product formation provides for a significant increase in the discharge capacity of the manganese dioxide. For example, a manganese dioxide/Zn battery comprising a cathode comprising manganese dioxide, an anode, and an aqueous electrolyte, can have a discharge capacity of at least about 1150 C/g. Specifically, a magnetically modified manganese dioxide cell can have a first cycle discharge capacity of a homogeneous phase 1e/1H$^+$ reduction that is at least 1.1 times that for a comparable battery electrode not comprising magnetic material and a second cycle discharge capacity of a 2e/2H$^+$ reduction that is at least 1.2 times that for a comparable battery electrode not comprising magnetic material. In other embodiments, the magnetically modified manganese dioxide cell can have a first cycle discharge capacity of a homogeneous phase 1e/1 H$^+$ reduction that is at least 1.5 times that for a comparable battery electrode not comprising magnetic material and a second cycle discharge capacity of a 2e/2H$^+$ reduction that is at least 2.0 times that for a comparable battery electrode not comprising magnetic material. As the term is used herein, comparable battery electrode not comprising magnetic material generally comprises the same components and is tested with the same parameters as a magnetically modified electrode, except that the unmodified electrode material is not modified by any magnetizable material.

Furthermore, this influence on the product crystal structure is particularly marked in the cycling of the electrode in a secondary cell. The Zn/MnO$_2$ cell components have also been used in secondary power cells. The basic cell design of secondary Zn/MnO$_2$ batteries is similar to that of primary Zn/MnO$_2$ batteries, thus making secondary Zn/MnO$_2$ batteries relatively inexpensive rechargeable power cells. However, because of particular chemical inefficiencies and a low single-use discharge capacity, conventional secondary Zn/MnO$_2$ batteries generally compete poorly with lithium-ion (Li-ion) and Nickel-Metal Hydride (Ni-MH) rechargeable batteries.

Chemical irreversibility of conventional secondary alkaline batteries has been combated by decreasing the molarity of the potassium hydroxide (KOH) electrolyte solution to decrease the solubility of Mn$^{3+}$, which can either be reduced to Mn(OH)$_2$ upon application of more negative potentials or reoxidized to various forms of MnO$_2$. In doing so, the Zn negative electrode (anode) capacity can be lowered and the passivation can become more facile. By including magnetic particles in secondary alkaline cell cathodes, the cells exhibit improved cycling properties, possibly due to the more consistent product formation.

The positive electrode of the power cells of interest generally contains manganese dioxide, electrically conductive particles, such as graphite, and other optional additives, such as a polymer binder and porosity enhancers. The positive electrode can also include catalysts to facilitate electron transfer from the MnO$_2$ to the Zn, such as, for example, mercury or other catalysts known to those skilled in the art. Such catalysts can also include, for example, catalysts for the recombination of hydrogen in the cell including metal, metal salt, or metal oxide of elements such as lead, nickel, titanium, lanthanum, chromium, vanadium, tantalum and catalytically active alloys thereof, such as those taught in U.S. Pat. No. 5,162,169 entitled "Catalytic recombination of hydrogen in alkaline cells," which is incorporated herein by reference. The negative electrode completes the redox couple with the manganese dioxide in the positive electrode. For commercial cells, the negative electrode generally comprises zinc, although cadmium and other materials can be used. A separator is placed between the positive and negative electrodes to provide ionic conductivity and electrical insulation. Generally, the cell structure with the positive electrode, the separator and the negative electrode is placed in a sealed container with electrolyte with the container holding the electrodes together to reduce internal impedance of the cell.

While other sources of manganese dioxide can be used, electrolytic manganese dioxide has desirable properties and is readily available commercially. Manganese dioxide prepared from the electrolysis of hot MnSO$_4$ at an anode, such as a graphite, titanium, or lead alloy anode, is termed electrolytic manganese dioxide or "EMD." Material so prepared reduces with a good performance, for example, in alkaline electrolyte in an alkaline cell. The EMD material is very porous, which provides a high surface area for reduction. A high initial voltage and low polarization (i.e., decrease in potential on discharge) generally distinguishes electrolytic manganese dioxide from other commercial forms of MnO$_2$.

During cell discharge, MnO$_2$ is ultimately reduced to Mn(OH)$_2$. The complete conversion generally comprises two sequential electron transfer reactions, as illustrated in equations (1) and (2) below.

$$MnO_2 + e + H_2O \rightleftharpoons MnOOH + OH^- \qquad (1)$$

$$MnOOH + e + H_2O \rightleftharpoons Mn(OH)_2 + OH^- \qquad (2)$$

In the first reaction as illustrated by equation 1, an electron and proton are simultaneously inserted into the crystal of MnO$_2$. The manganese oxyhydroxide can then be reduced further to Mn(OH)$_2$, as illustrated in equation (2). The net reaction produces two mole equivalents of hydroxide ion. At the anode, the Zn is oxidized to Zn(OH)$_2$, as illustrated in equation (3) below.

$$Zn(OH)_2 + 2e \rightleftharpoons Zn + 2(OH^-) \qquad (3)$$

Thus, the hydroxide ions produced at the cathode are taken up at the anode. The net cell reaction is illustrated in equation (4), the potential of which is 1.55 V.

$$MnO_2 + 2H_2O + Zn \rightleftharpoons Mn(OH)_2 + Zn(OH)_2 \qquad (4)$$

With respect to performance of primary alkaline batteries, the discharge capacity of as-fabricated magnetically modified manganese dioxide electrodes exceeds that of untreated manganese dioxide electrodes. In a primary power cell, it is desirable to increase single-use discharge capacity to increase the lifetimes of the cells. The discharge capacity can be calculated from the discharge curve (i.e., the closed-circuit potential vs. time curve). Using the closed-circuit potential vs. time curves, the discharge capacity.

Discharge capacity is a measure of the ability of a material to transduce chemical energy into electrical energy. The popular units among battery engineers are Ahg$^{-1}$, where A is Amperes, h is hours, and g is grams of material. Using C=A·h and h=3600 s, Ahg$^{-1}$ can be converted to Cg by multiplying by 3600 s.

The theoretical capacity of any battery material can also be calculated using equation (5) below, where n is the number of electrons transferred, F is the Faraday constant (96485.309 C mol$^{-1}$), and MW is the molecular weight of the compound.

$$\text{Theoretical Capacity} = \frac{nF}{MW} \qquad (5)$$

For example, the theoretical capacity for the homogeneous-phase reduction, equation (6), is 1110 Cg$^{-1}$ (0.308 Ahg$^{-1}$). The theoretical capacity for the complete 2e/2H$^+$ discharge of γ-MnO$_2$ to Mn(OH)$_2$ is then double that amount, 2220 Cg$^{-1}$ (0.616 Ahg$^{-1}$).

$$\gamma\text{-}MnO_2 + e + H_2O \rightleftharpoons \delta\text{-}MnOOH \qquad (6)$$

Due to chemical inefficiencies, the measured capacity is generally always smaller than the theoretical capacity. The goal is generally to optimize the experimental variables to maximize the percent theoretical capacity, see equation (7).

$$\text{percent theoretical capacity} = \frac{\text{measured capacity}}{\text{theoretical capacity}} \times 100\% \quad (7)$$

The specific discharge capacity is a measure of the ability of a material per unit weight to transduce chemical energy into electrical energy.

In addition to discharge capacity, another parameter to consider from the discharge curve is the cell voltage. The product of voltage (V) and current (I) is power (P), equation (8). As such, based upon equation (8), a power cell that discharges at a high potential for a longer discharge time has higher power for a longer period of time than one having a small potential and short discharge time.

$$P = I \cdot V \quad (8)$$

Furthermore, cell polarization, i.e., the decrease in cell potential with current flow, is decreased with the magnetically modified electrodes. While the potential of untreated manganese dioxide steadily decreases throughout the entire reduction, both types of samarium cobalt-treated electrodes maintain higher potentials for longer times, thus enabling more power to be drawn from the batteries.

With respect to secondary alkaline batteries, the magnetically modified manganese dioxide electrodes can be more effectively cycled over sequential oxidation and reduction steps to deep discharges of −0.3 V vs. Hg/HgO. Unlike the oxidation of $Mn(OH)_2$ in untreated positive electrodes, evidently undesirable $\delta$-$MnO_2$ does not form in appreciable quantities in (magnetically-treated positive electrodes) MTCs. Because $\delta$-$MnO_2$ is rare in MTCs, very little insulating $Mn_3O_4$ forms during reduction. Instead, magnetic modification favors the newly favored reduction reaction, which can generate a considerable quantity of charge. Thus, in addition to the capacity of the reversible homogeneous-phase reduction, the new process increases the rechargeability of the power cell.

The power cell with a MTC also can have a longer primary discharge lifetime. Strong rare earth magnets like $Sm_2Co_{17}$ can double the discharge capacity of magnesium dioxide, such as electrolytic manganese dioxide. This increased discharge capacity results from facilitation of the electron transfer reactions, particularly those occurring at later stages in the reduction. Those attempting to recharge a fully discharged batter could find that nearly all the energy removed on the first discharge could be restored. As such, unlike with conventional rechargeable batteries, the user would not be punished for overdischarging the cell.

Positive Electrode Structure and Composition

As described above, improved positive electrodes for electrolytic cells have magnetic particles associated with the electrode. Referring to FIG. 1, a representative positive electrode 100 for power cells is shown schematically. Positive electrode 100 generally comprises electrolytic manganese dioxide particles 102, an electrically conductive material 104, an optional binder 106, and the magnetizable material 108.

Manganese oxide has a rich phase diagram since manganese oxides are known to exist in a wide range of oxidation states from +2 to +4. The most common stoichiometries for manganese oxides include MnO, $Mn_3O_4$, $Mn_2O_3$, $Mn_5O_8$, and $MnO_2$. Furthermore, $MnO_2$ generally has either a cubic, orthorhombic or tetragonal crystal structure. For use in alkaline batteries, $\gamma$-$MnO_2$ (gamma-phase manganese dioxide) is generally thought to be a desirable crystalline form.

Magnetizable materials are materials that develop a magnetic moment following exposure to a strong magnetic field for a sufficient period of time. Examples of magnetizable materials include, for example, permanent magnetic materials, paramagnetic materials, superparamagnetic materials, ferromagnetic materials, ferrimagnetic materials, superconducting materials, anti-ferromagnetic materials, and combinations thereof. Magnetic materials for association with the positive electrode have a stable magnetic moment following the removal of an external magnetic field. Magnetizable materials that are suitable for forming magnetic materials include, for example, permanent magnetic materials, ferromagnetic materials, ferrimagnetic materials, superconducting materials and combinations thereof. Suitable magnetizable materials for inclusion in a magnetically modified cathode include, for example, $Sm_2Co_{17}$, $SmCo_5$, NdFeB, $Sm_2Co_7$, $La_{0.9}Sm_{0.1}Ni_2Co_3$, $Ti_{0.51}Zr_{0.49}V_{0.70}Ni_{1.18}Cr_{0.12}$, $Fe_3O_4$, and $Fe_2O_3$. While ranges of magnetizable materials are contemplated and described below, reasonably low amounts of magnetic particles can be used to provide substantial improvements in electrode performance.

The electrically conductive materials can be added to increase the cell conductivity and provide a reactive surface for the heterogeneous-phase reaction. Suitable electrically conductive materials include, for example, graphite, carbon black, metal powders, combinations thereof and the like. A binder can be added to bind the electrode mass together and provide structural integrity to the positive electrode when it is formed. Suitable binders include, for example, polytetrafluoroethylene (PTFE), methyl cellulose, polyethylene oxide, combinations thereof or the like.

Once the electrode materials are mixed, the electrodes can generally comprise between about 25 to about 99 weight percent $MnO_2$, in further embodiments between about 50 to about 98 weight percent $MnO_2$, and in additional embodiments between about 60 and about 97 weight percent $MnO_2$. The electrodes can generally comprise between about 0.5 to about 50 weight percent of the magnetizable material, in further embodiments between about 1 to about 40 weight percent, and in additional embodiments between about 2 to about 30 weight percent. The electrodes generally comprise between about 1 and about 35 weight percent electrically conductive particles, in further embodiments between about 1 and about 15 weight percent electrically conductive particles, and in additional embodiments between about 2 and about 12 weight percent electrically conductive particles. The electrodes can comprise an optional binder. If a binder is present, the electrode generally comprise from about 0.1 to about 15 weight percent binder, in further embodiments between about 0.2 and about 10 weight percent of a binder, and in additional embodiments between about 0.5 and about 7 weight percent of a binder. A person of ordinary skill in the art will recognize that additional ranges within the explicit ranges given above are contemplated and are within the present disclosure.

With respect to volume percent, the electrodes can generally comprise between about 25 to about 99 volume percent $MnO_2$, in further embodiments between about 50 to about 98 volume percent $MnO_2$, and in additional embodiments between about 60 and about 97 volume percent $MnO_2$. The electrodes can generally comprise between about 0.5 to about 50 volume percent of the magnetizable material, in further embodiments between about 1 to about 40 volume percent, and in additional embodiments between about 2 to about 30 volume percent. The electrodes generally comprise between about 1 and about 35 volume percent electrically conductive particles, in further embodiments between about 1 and about 15 volume percent electrically conductive particles, and in additional embodiments between about 2 and about 12 volume percent electrically conductive particles. The electrodes can comprise an optional binder. If a binder is present, the electrode generally comprise from about 0.1 to about 15 volume percent binder, in further embodiments between about 0.2 and about 10 volume percent of a binder, and in additional embodiments between about 0.5 and about 7 volume percent of a binder. A person of ordinary skill in the art will recognize that additional ranges within the explicit ranges given above are contemplated and are within the present disclosure.

In general, the electrically conductive particles are blended with the manganese dioxide particles so that the electrically conductive particles can provide a conduction pathway for electrons produced or consumed by the reaction at the positive electrode. The magnetic particles do not necessarily need to be in very near physical proximity to the manganese dioxide. However, the strength of the magnetic field does drop off with distance. Thus, the magnetic particles can be blended within the electrode structure to provide a uniform distribution of magnetic particles. In alternative embodiments, the magnetic particles are placed in only a portion of the electrode structure, such as along a surface away from the separator.

In further embodiments, the $MnO_2$ can be magnetized in addition to, or in lieu of, the inclusion of magnetizable material. $MnO_2$ can exhibit ferromagnetism. When magnetized, desirable power cell performance of a zinc/manganese dioxide call can be can be obtained in addition or in lieu of the inclusion of magnetic particles. Such desirable performance can include a higher power level and increased discharge capacity. In secondary cells, it is thought that significant improvement in the cycling behavior can be achieved by magnetizing the $MnO_2$.

Also, the electrode can comprise a current collector to facilitate electrical connection of the electrode with an external circuit as well as to reduce the internal impedance of the electrode. Suitable current collectors include, for example, metal (e.g., copper) nails, elemental metal foils, metal grids, or the like. The current collector generally should be formed from an inert metal, such as nickel, or of a carbon material, such as carbon cloth.

Processing For Positive Electrode Production

Referring again to FIG. 1, to form positive electrode 100, magnetic particles 108 can be mixed with $MnO_2$ particles 102, graphite powder 104, and polymer binder 106 to form a composite electrode structure. Prior to performing the electrochemistry, if not prior to incorporation into the electrode, the particles can be magnetized with a strong magnetic field or external magnet, such that they have a magnetic moment during the electrochemical reactions.

Once the composite electrode material components have been combined, the material can be shaken, stirred, or otherwise mixed to generally uniformly distribute the components. Suitable mixers can be selected to mix the materials based on the quantities to be mixed. After the components have been mixed, the mixture can then be pressed or compacted into cathode preforms 100. For example, conventional presses and suitable dies are known in the art to apply selected pressures to compress the electrode structure, although presently nonconventional approaches can be similarly used. The preforms can comprise a hollow cylindrical shape, a plate shape, a sheet shape, disc shape, or other geometrical or non-geometrical shape.

Power Cell Structure and Processing

Figure 2:
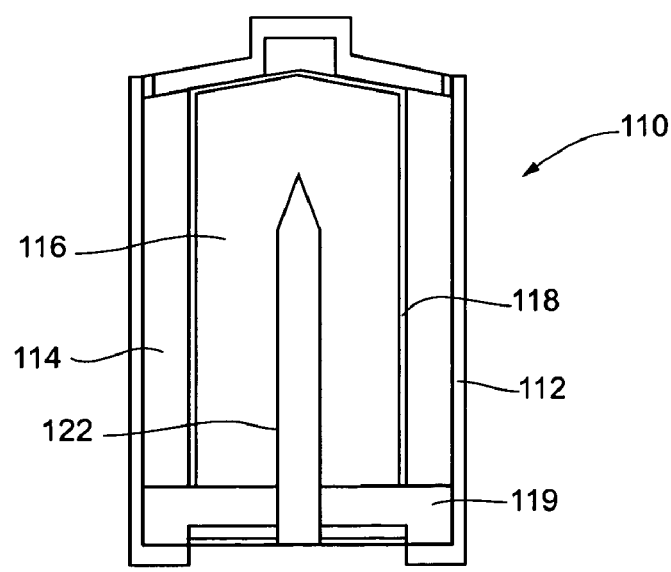
FIG. 2 is a sectional side schematic view of a power cell with a magnetically modified manganese dioxide electrode.
Figure 2:
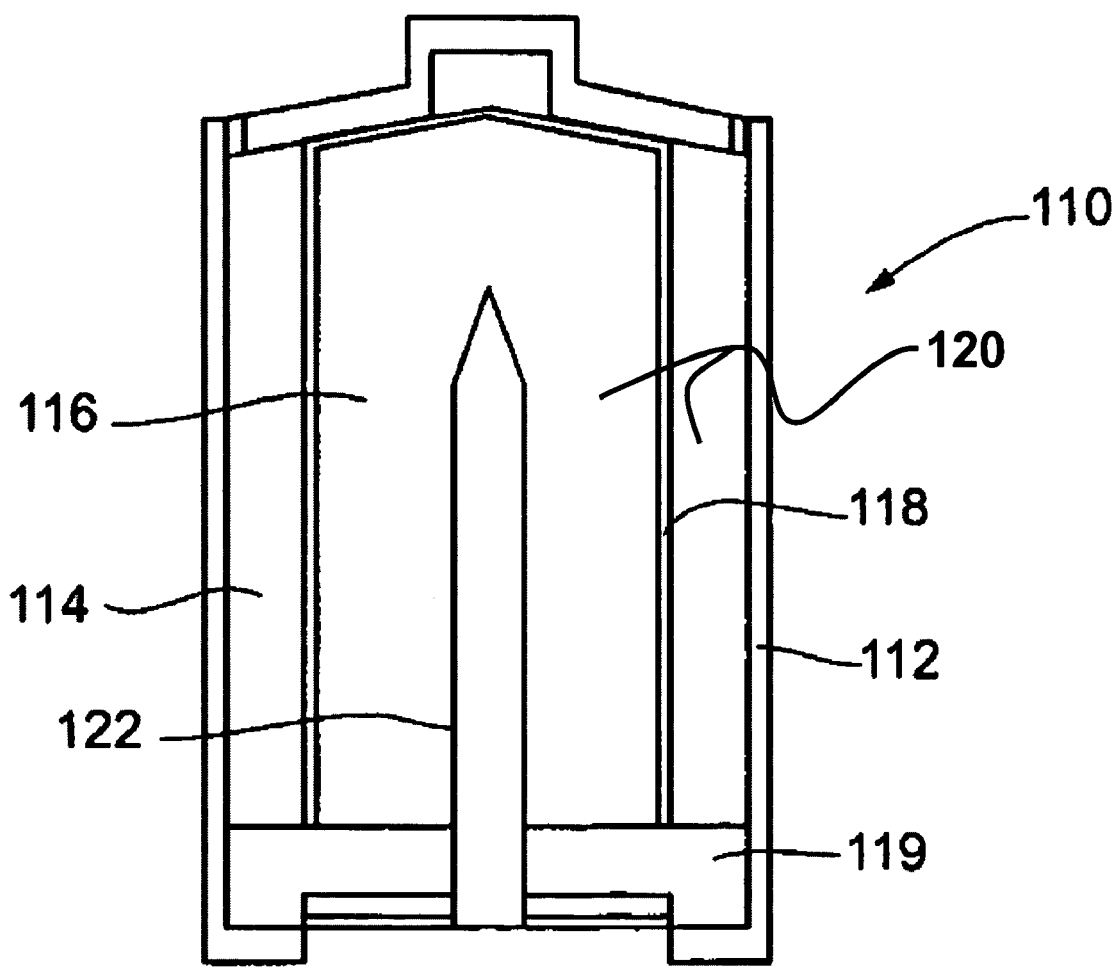

Referring to FIG. 2, in an embodiment, a power cell or battery assembly 110 generally comprises a case 112, such as a steel can, that forms the power cell container. The power cell further comprises a positive electrode 114, a negative electrode 116, a separator 118 for electrically separating positive electrode 114 and negative electrode 116, and an electrolyte 120, such as aqueous KOH.

Case 112 can be generally cylindrical in shape for use as power cells, such as for A, AA, AAA, C, and D batteries. Alternatively, steel case 112 can generally comprise a polyhedral shape, such as for 9-volt batteries. Those skilled in the art will recognize that the case 112 can be constructed of suitable materials with appropriate insulating elements to separate the opposite poles of the battery while obtaining appropriate thermal, electrical, and anti-corrosive properties.

The compacted composite positive electrode preform 114 can be molded or otherwise coupled in case 112. The inner portion of the cathode 100 can be lined with a separator 118 to electrically isolate positive electrode 114 from negative electrode 116. Suitable negative electrodes can be, for example, zinc or cadmium elements or corresponding metal powders bound with a polymer gelling agent. The separator 118 can be, for example, paper (such as a fibrous fabric) or a synthetic material (such as ion conducting polymer or paper sheet), and can be soaked in the electrolytic solution, such as KOH (alkaline cell), ammonium chloride and zinc chloride (LeClanche cell), or zinc chloride (zinc chloride cell). Separator 118 should be porous or capable of ion exchange capability to provide for effective ion flow across the separator. Once the separator 118 has been placed in positive electrode 114 and negative electrode 116 and an electrolyte solution 120 have been placed into case 112, the case 112 can be sealed with a sealant 119, such as an adhesive.

In addition to the case 112, electrodes 114, 116, separator 118, and electrolyte 120, the power cell 110 can further comprise an electrically conducting collector pin 122 extending into the cylinder 112 as a current collector associated with negative electrode 116. Collector pin 122 can be welded or otherwise coupled to a metal end cap.

Figure 3:
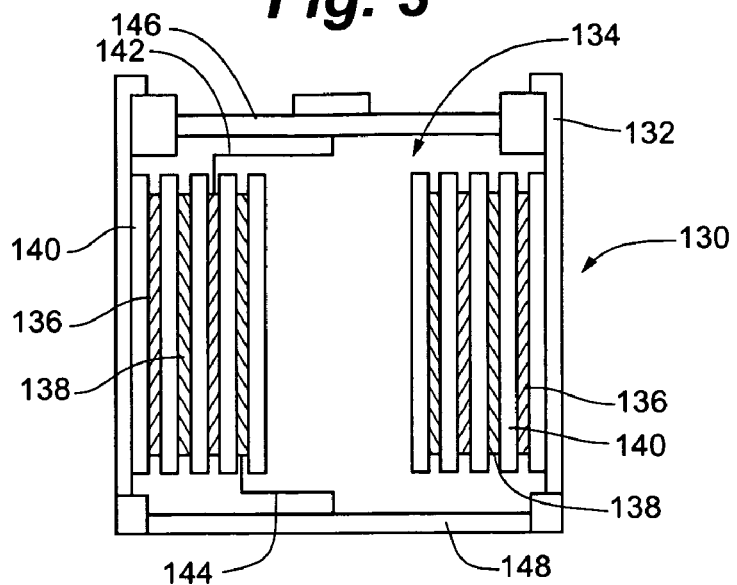
FIG. 3 is a sectional schematic view of a power cell with wound electrodes within a sealed canister.

A power cell or battery assembly 130 according to a further embodiment is depicted in FIG. 3. Battery assembly 130 comprises a battery can 132 and wound electrolytic cell 134 comprising a positive electrode 136 and a negative electrode 138 and separator sheets 140 between positive electrode 136 and negative electrode 138. Battery assembly 130 further comprises a positive electrode lead 142 and a negative electrode lead 144, wherein each lead is coupled to positive terminal or negative terminal 146, 148 of battery assembly 130, respectively.

As noted herein, the manganese dioxide modified with magnetic particles can have improved performance as both a primary cell and a secondary cell. Within a primary cell, the magnetically modified manganese dioxide can exhibit a specific discharge capacity of at least about 1150 C/g, in some embodiments at least about 1250 C/g and in further embodiments at least about 1400 C/g. The specific discharge capacity can be evaluated at a constant discharge current of 33⅓ mA/g of $MnO_2$. As a secondary cell, the magnetically modified manganese dioxide can exhibit significantly improved cycling properties. Specifically, the manganese dioxide can exhibit a specific discharge capacity on a tenth discharge cycle of at least about 250 C/g discharged to −300 millivolts measured relative to a Hg/HgO standard and on a fifth discharge cycle of at least about 400 C/g and in further embodiments at least about 500 C/g discharged to −700 millivolts measured relative to a Hg/HgO standard. A person of ordinary skill in the art will recognize that additional ranges of battery performance within these explicit ranges are contemplated and are within the present disclosure.

Those skilled in the art will recognize that other power cell or battery configurations can be used with the various embodiments of the magnetically modified electrode. Construction of commercial alkaline manganese dioxide batteries is described further in U.S. Pat. No. 5,489,493 to Urry, entitled "Alkaline Manganese Dioxide Cell," incorporated herein by reference.

EXAMPLES

Electrode Preparation and Electrochemical Cell Assembly

In performing the measurements herein, the electrode samples were in two general categories: (1) experimental electrodes and (2) control electrodes. The various chemicals that were used to make the electrodes are listed in Table 1.

TABLE 1

Materials List for Electrode Construction

| Chemical | Source |
|---|---|
| EMD | Chemalloy Company, Inc. |
| EMD | Aldrich |
| Synthetic Graphite | Aldrich |
| Polytetrafluoroethylene (PTFE) | Aldrich |
| TiO2 | Ti-Pure |
| Magnetic Materials | |
| $Sm_2Co_{17}$ | * |
| $SmCo_5$ | Aldrich |

* $Sm_2Co_{17}$ powder can be obtained from, e.g., YuXiang Magnetic Materials Ind. Co., Ltd. and Electron Energy Corporation.

Testing revealed that the EMD comprised 92.47% $MnO_2$ and 1.5% $H_2O$. Synthetic graphite powder was added in small amounts to increase the cell conductivity and provide a reactive surface for the heterogeneous-phase reaction. PTFE powder bound the mass together and provided structural integrity. The three types of magnetic microparticles that were used were rare earth magnets (NdFeB, $Sm_2Co_{17}$, and $SmCo_5$).

The experimental electrodes contained EMD, graphite, PTFE, and one of the three magnetic materials (NdFeB, $Sm_2Co_{17}$, $SmCo_5$). In examples 1-8, only $Sm_2Co_{17}$ was used. The powder components were placed in glass scintillation vials (Wheaton: 2.75 cm dia., 6.1 cm height) in the following order: (1) EMD, (2) graphite, (3) experimental or control additive (if any), (4) PTFE. After each component addition, the vials were shaken by hand for approximately thirty seconds. After each of the components had been added, a variable-speed electric drill was used to rotate the vials slowly (v≦60 rpm) for three days.

A stainless steel die with an inner diameter of 0.794 cm was used to shape the electrode into disc-shaped electrodes. An aluminum spacer was used to elevate the die sleeve from the lip of the bottom ram. The weighed aliquot of the mixed sample was carefully added to the die, followed by gentle tapping of the assembly to distribute the powder evenly. The top ram covered the powder mixture and 1.2 tons was applied for 1 minute with a Carver hydraulic press. Pushing the sleeve down on the bottom ram removed the disc electrode from the die.

The electrochemical instrumentation used a three electrode cell, composed of working, counter, and reference electrodes. The working electrode was the pressed EMD disc. Electrical contact was provided by a rectangular strip of carbon cloth carbon cloth (E-TEK, B-1/A Carbon Cloth Designation A, plain, no wetproofing), the short edge of which was slightly larger than the EMD disc electrode (≈0.9 cm). The carbon cloth strip was sufficiently long so that an alligator clip could be clamped onto it away from the working electrode. The disc and cloth were pressed together with two acrylic plates machined with holes. The small center holes provided direct solvent contact to the electrode and the larger holes on the periphery were used for gas ventilation. The plates were fastened with four screws and nuts. The counter electrode was also carbon cloth of the same origin, cut into a 1.5 in.×1.5 in. square flag. The carbon cloth strips that formed the working and counter electrodes were connected to the potentiostat/galvanostat with stainless steel alligator clips. Hg|HgO, 6 M KOH (Koslow) served as the reference electrode.

Circular plastic plates were used to position the EMD disc in the center of a polyethylene beaker. The counter and working electrode leads were positioned on opposite sides of the container and 6M KOH (Fisher Scientific, UN1813) was poured in to submerge both working and counter electrodes. Parafilm was used to cover the beaker opening to prevent any solvent loss and dust accumulation and the assembly was set aside overnight.

After overnight storage of the electrodes, $N_2$ bubbling was performed on the KOH electrolyte to remove any dissolved oxygen. The purging was continued for 20 minutes prior to the electrolysis and during the experiments for the samples in Tables 3 and 4. For samples in Table 2, however, the $N_2$ purging was stopped before the samples were discharged. After reduction began at the working electrode, $O_2$ was formed at the counter electrodes.

TABLE 2

Compositions of CCCP-tested Electrodes with 10% vol/vol Graphite.

| Component | Percent mass/mass | Percent vol/vol |
|---|---|---|
| $Sm_2Co_{17}$-Treated Cathodes | | |
| EMD | 73.31 | 69.73 |
| $Sm_2Co_{17}$ | 17.45 | 14.91 |
| graphite | 7.02 | 10.05 |
| PTFE | 2.22 | 5.30 |
| $SmCo_5$-Treated Cathodes | | |
| EMD | 68.97 | 69.87 |
| $SmCo_5$ | 24.63 | 15.11 |
| graphite | 4.43 | 10.01 |
| PTFE | 1.97 | 5.02 |
| NdFeB-Treated Cathodes | | |
| EMD | 71.33 | 71.4 |
| NdFeB | 22.89 | 15.36 |
| graphite | 5.60 | 10.2 |
| PTFE | 1.18 | 2.96 |
| $TiO_2$-Treated (Control) Cathodes | | |
| EMD | 78.97 | 69.73 |
| $TiO_2$ | 13.64 | 15.14 |
| graphite | 5.08 | 10.02 |
| PTFE | 2.30 | 5.11 |
| Unmodified (Control) Electrodes | | |
| EMD | 92.93 | 85 |
| graphite | 4.87 | 9.95 |
| PTFE | 2.20 | 5.05 |

TABLE 3

Compositions of CCCP-tested Electrodes with 30% vol/vol Graphite.

| Component | Percent mass/mass | Percent vol/vol |
|---|---|---|
| $Sm_2Co_{17}$-Treated Cathodes | | |
| EMD | 55.78 | 50.26 |
| $Sm_2Co_{17}$ | 27.13 | 14.80 |
| graphite | 14.90 | 29.98 |
| PTFE | 2.19 | 4.96 |
| Unmodified (Control) Cathodes | | |
| EMD | 80.66 | 64.75 |
| graphite | 16.82 | 30.16 |
| PTFE | 2.52 | 5.09 |

TABLE 4

CV-Tested Electrode Compositions.

| Component | Percent mass/mass | Percent vol/vol |
|---|---|---|
| $Sm_2Co_{17}$-Treated Cathode | | |
| EMD | 55.79 | 49.87 |
| $Sm_2Co_{17}$ | 27.78 | 15.20 |
| graphite | 14.80 | 29.87 |
| PTFE | 2.23 | 5.06 |
| $SmCo_5$-Treated Cathode | | |
| EMD | 55.4 | 49.96 |
| $SmCo_5$ | 27.48 | 15.01 |
| graphite | 14.9 | 30.02 |
| PTFE | 2.21 | 5.01 |
| $Sm_2Co_{17}$-Pretreated Cathode | | |
| EMD | 76.5 | 58.9 |
| graphite | 20.5 | 35.3 |
| PTFE | 3.0 | 5.9 |
| Untreated (Control) Cathode | | |
| EMD | 80.74 | 64.87 |
| graphite | 16.75 | 30.06 |
| PTFE | 2.57 | 5.07 |

Methods of Constant-Current Chronopotentiometry (CCCP) and Cyclic Voltammetry (CV) were used to evaluate the discharge performances and redox mechanisms, respectively, of the various EMD samples. Two galvanostats (Princeton Applied Research Model 173/276 Potentiostat/Galvanostat) were used to perform the CCCP experiments in pairs. A single BAS100 potentiostat was used to run the CV experiments. For CCCP experiments, the galvanostats discharged all electrodes at a constant current of approximately 33⅓ $mAg^{-1}$ until the working electrode potential reached −700 mV (vs. Hg/HgO). The constant current was based on mass of EMD in the electrode. The CV potentiostat was used to cycle the working electrode potential from the rest potential to −700 mV (vs. Hg/HgO), then back to +500 mV. The potential scan was a linear ramp for each reduction and each oxidation segment. All electrochemical experiments were run at room temperature and pressure. MATLAB® software was used to scale the charge (CCCP) and current (CV) data by the EMD mass in the electrode to produce the plots presented in the results section.

X-ray diffraction patterns and magnetic susceptibility measurements were used to supplement the electrochemical data. A Siemens D5000 X-ray Diffractometer was used to scan powder samples with Cu Kα radiation (40 kV, 30 mA) from 15° to 65° 2θ. An Evans Balance (Johnson-Matthey) was used to measure magnetic susceptibilities of the same samples (Table 5).

TABLE 5

Final Sample Compositions for X-ray Diffraction and Magnetic Susceptibility Analysis.

| Component | Percent mass/mass |
|---|---|
| $SmCo_5$-Pretreated Sample | |
| EMD | 79.01 |
| graphite | 20.99 |
| Untreated Sample | |
| EMD | 79.30 |
| graphite | 20.70 |

TABLE 6

Discharge Capacities for the Various EMD Samples.

| | 1e/1H+ | | 2e/2H+ | | |
|---|---|---|---|---|---|
| Additive | Capacity, $Cg^{-1}$ | % Theoretical Capacity | Capacity, $Cg^{-1}$ | % Theoretical Capacity | n |
| Electrodes with 10% vol/vol Graphite | | | | | |
| none | 600 (±77) | 54% | 860 (±120) | 38.7% | 4 |
| $TiO_2$ | 346 (±44) | 31.2% | 621 (±9) | 28% | 3 |
| $SmCo_5$ | 709 (±27) | 63.9% | 1,130 (±50) | 50.9% | 3 |
| $Sm_2Co_{17}$ | 886 | 79.8% | 1,769 | 79.7% | 1 |
| Electrodes with 30% vol/vol Graphite | | | | | |
| none | 870 (±50) @ −500 mV | 78.4% | 1000 (±50) | 45% | 2 |
| $Sm_2Co_{17}$ | 740 (±20) | 67% | 1300 (±20) | 58.6% | 2 |

Figure 4:
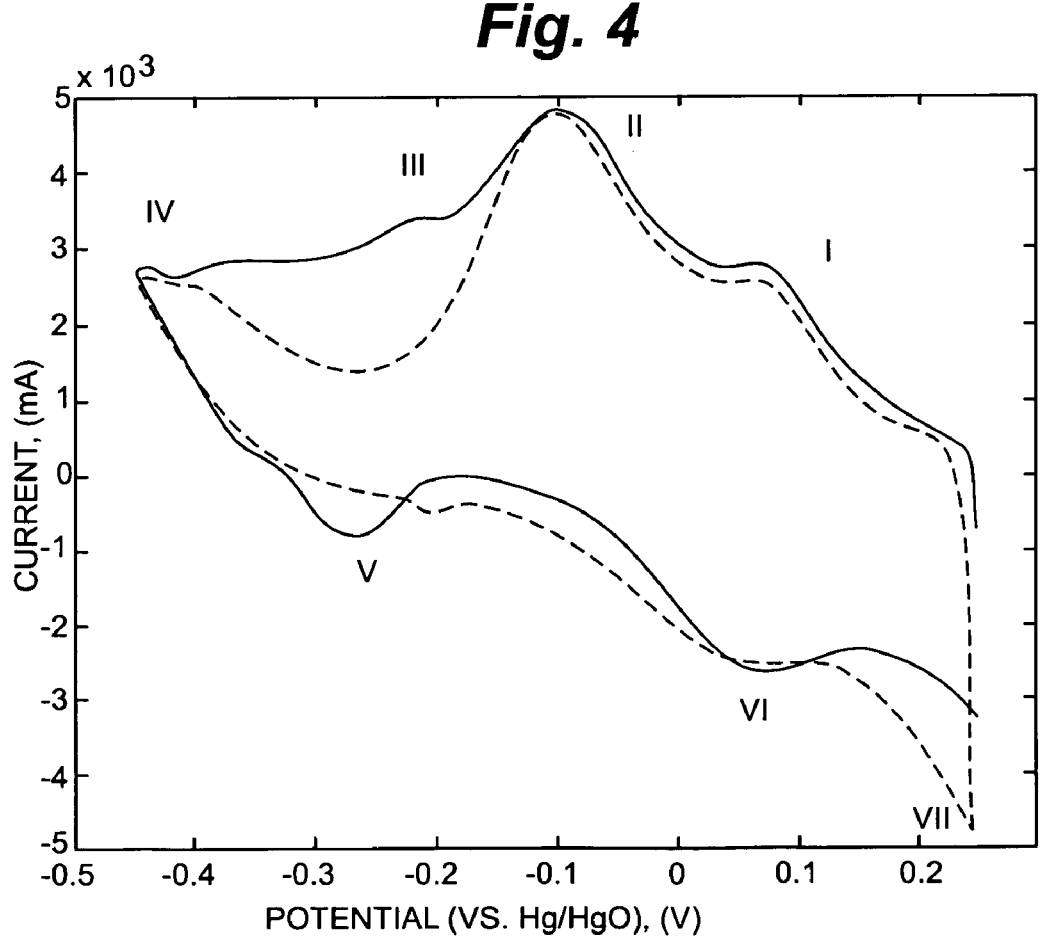
FIG. 4 is a Cyclic Voltammogram (CV) plot of 10% vol/vol $Sm_2Co_{17}$/EMD (broken line) and 10% vol/vol $TiO_2$/EMD (solid line) composite electrodes.

FIG. 4 depicts a CV plot of 10% vol/vol $Sm_2Co_{17}$/EMD (broken line) and 10% vol/vol $TiO_2$/EMD (solid line) composite electrodes. Roman numerals I, II, III, IV, V, and VI refer to reduction and reoxidation processes during the experiment.

Example 1

49.34 Percent Mass $Sm_2Co_{17}$

Figure 5:
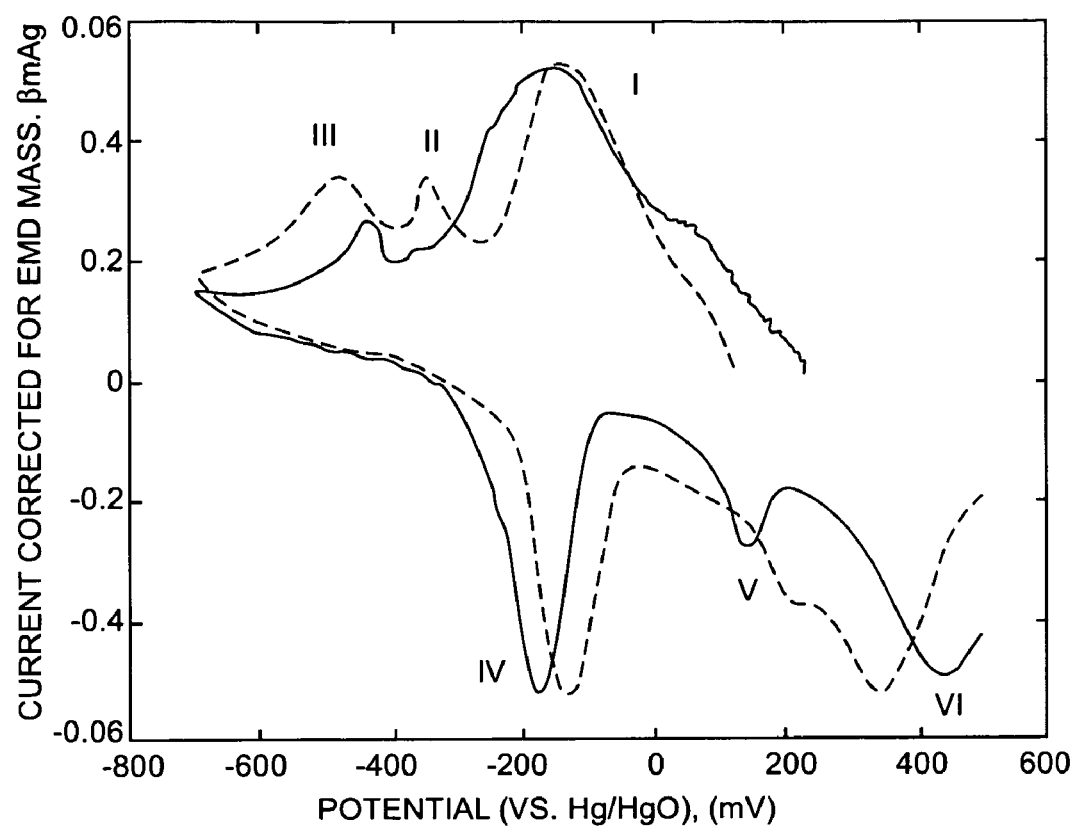
FIG. 5 is a CV plot for magnetically modified composite electrodes (broken line) and unmodified composite electrodes (solid line).
Figure 6:
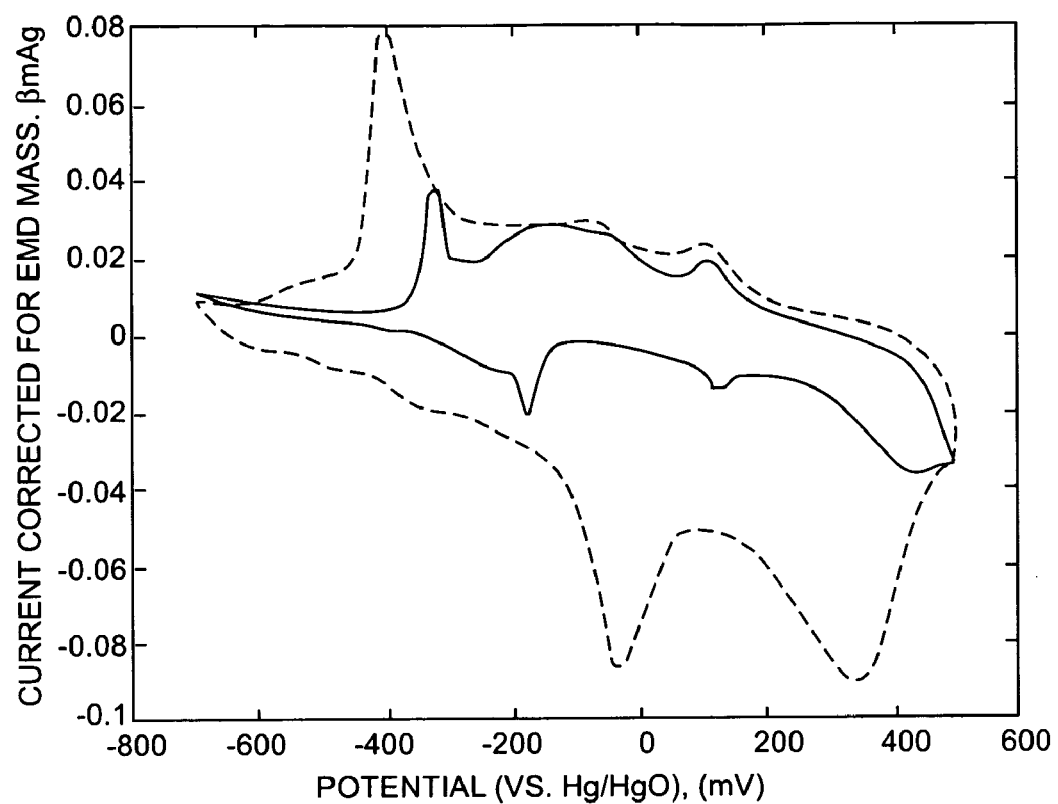
FIG. 6 is a second cycle CV plot for magnetically modified composite electrodes (broken line) and unmodified composite electrodes (solid line).

Referring to FIGS. 5 and 6, this example was directed to CV experiments performed on EMD (Sigma-Aldrich, EC 215-202-6, Batch #10826JA). The EMD was first mixed with graphite (Sigma-Aldrich, EC 231-955-3) and PTFE powder (Sigma-Aldrich, 03625BS) in an EMD:graphite:PTFE ratio of 0.5944:0.3532:0.05240. This mixture was named EMDSA1.

The magnetically modified electrode (called EMDSA1SA) was formed by mixing 49.34 percent mass $Sm_2Co_{17}$ magnetic microparticles with the EMD/graphite/binder mixture. 0.3519 g of the modified mixture was pressed at 1.2 tons of applied pressure using the Carver hydraulic press. An unmodified EMD composite electrode was made by pressing only the EMDSA1 mixture (nothing else was added). Both of the composite electrodes were soaked overnight in 5M KOH, followed by an $N_2$ purge before starting the experiments.

Rest potential measurements were made to determine Initial Potential "$E_{INIT}$". The negative switching potential for both experiments was −0.7 V and the positive switching potential was 0.5 V. The scan rate was set to 20 μV s-1. Several cycles were collected for each electrode type. The amount of EMD in the experimental and blank composites, after pressed, was evaluated to be 0.1060 g and 0.0854 g, respectively. The currents recorded were scaled by these masses to produce the plots depicted in FIG. 5.

The rest potential of this material was 235 mV. The initial reduction process labeled (I) was the proton-electron insertion step discussed before and the existence of three peaks indicated that the electrode was actually reduced in three closely related steps. The next reduction step labeled (III) occurred at −435 mV. Reoxidation of the reduction products gave three oxidation current peaks at −175 mV (IV), 150 mV (V), and 450 mV (VI).

Reduction of the magnetically modified EMDSA1 sample started at a rest potential of 125 mV. The electrode did not exhibit a reduction current at −220 mV. Two more reduction peaks appeared at −340 mV (II) and −475 mV (III). The former could be due to the formation of $Mn_3O_4$, and the latter was probably due to heterogeneous reduction of MnOOH to $Mn(OH)_2$. The anodic peaks observed on the return sweep occurred at different potentials than those of the unmodified EMDSA1 electrode. The process (IV) was shifted up to Anodic Peak Potential "$E_p^a$"≈−130 mV, process (V) up to 220 mV, and process (VI) down to 340 mV.

Example 2

Modified EMDSA1 Mixture

Figure 7:
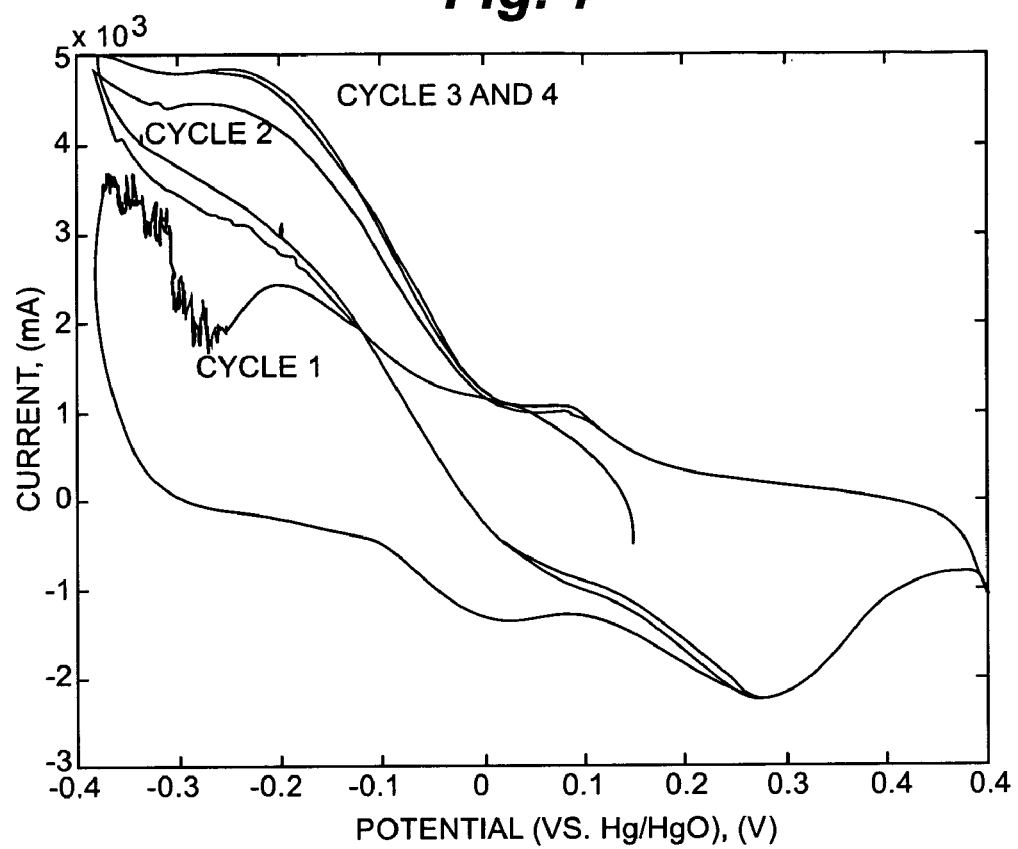
FIG. 7 is a first through fourth cycle CV plot for a magnetically modified EMD with 50% wt/wt. $Sm_2Co_{17}$ magnetic microparticles.

Referring to FIG. 7, in this example three electrodes were constructed from the EMDSA1 mixture. 50% wt/wt. $Sm_2Co_{17}$ magnetic microparticles was mixed in with the EMDSA1. After the composite electrode material was pressed, the three electrodes had an average weight of 0.1644 g. The electrodes were soaked overnight in 6M KOH and the electrolyte solution was nitrogen purged before and during potential cycling. The negative switching potential was set more negative to −0.38 V, which was approximately between the second and third reduction peaks on the first scan of EMDSA1SA. The positive switching potential was set to 0.5 V.

On the first reduction segment, three reduction peaks were observed: one at 0.1 V, another at about −0.2 V, and a third at −0.37 V. The return oxidation exhibited peaks at similar locations as were observed for the conventional power cell EMD, the peak at 0.4 V corresponding to the oxidation on α-MnOOH to γ-$MnO_2$. Relative to the first reduction segment, the second, third and fourth reduction segments exhibited increases in reduction current. The third and fourth reduction segments were nearly identical.

Examples 3-7

Primary Discharge Results—CCCP

In the following examples, the experimental electrodes contained EMD, graphite, PTFE, and one of the three magnetic materials (NdFeB, $Sm_2Co_{17}$, $SmCo_5$). All of the experimental electrodes had a 15% vol/vol loading of magnetic particles. Two different types of control samples were tested: one with 15% vol/vol $TiO_2$ ("$TiO_2$-treated" control) and the other with extra 15% vol/vol EMD that replaced the volume of the additive (whether a magnetic additive or $TiO_2$) ("untreated" control). The compositions of the electrodes tested in Examples 10-13 are listed in Table 2 (electrodes with 10% vol/vol graphite). The compositions of the electrodes tested in Example 14 are listed in Table 3 (electrodes with 30% vol/vol graphite).

Example 3

Untreated EMD—10% vol/vol Graphite

Figure 9:
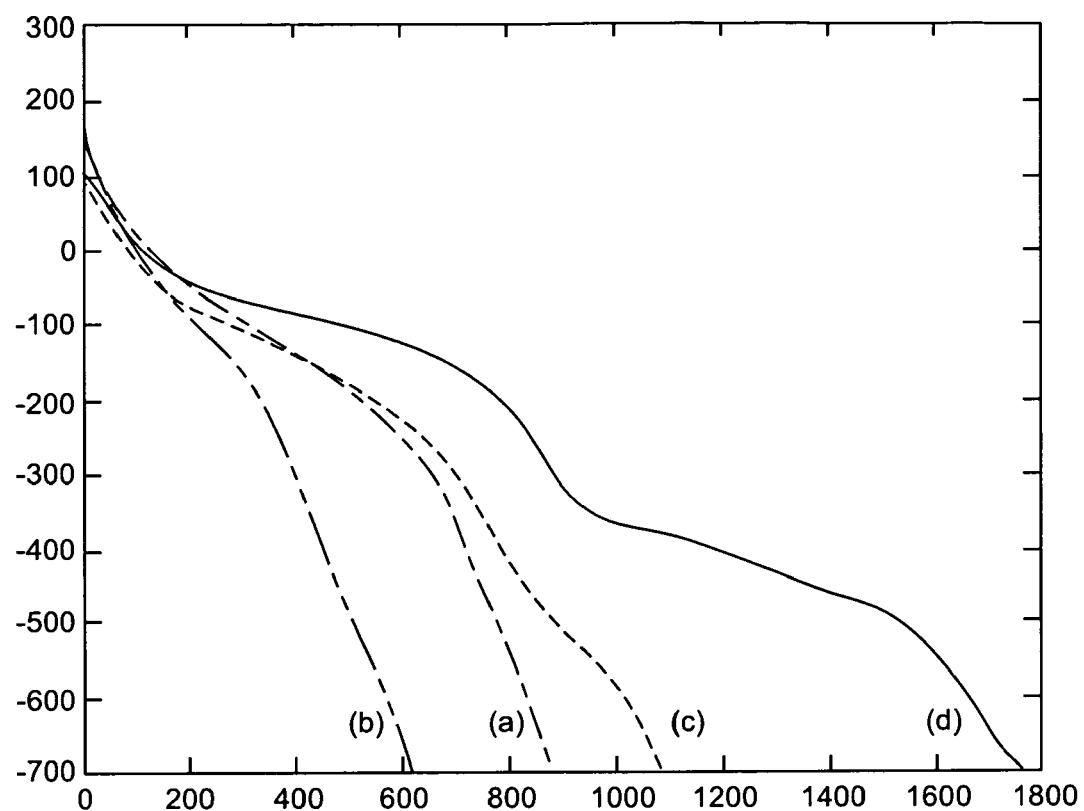
FIG. 9 is an overlay plot of discharge curves (a), (b), (c), and (d) of FIGS. 8(a)-8(d), respectively.

Referring to FIGS. 8 and 9, the discharge characteristics of this electrode type are presented first to illustrate the general features of the reduction. The basic potential response of untreated EMD has three main regions on the primary discharge (depicted in FIGS. 8(a) and 9).

Upon initial electrolysis, the potential decreased rapidly from a rest potential of 242 (±2, n=4) mV to ≈−100 mV. Reduction of $Mn^{4+}$ on the surface layer of the EMD marked the beginning of the homogeneous-phase, 1e/1$H^+$ process. Cell polarization lessened between −100 mV and −300 mV as the reduction of $Mn^{4+}$ in the bulk γ-$MnO_2$ crystal proceeded. When conversion of γ-$MnO_2$ to δ-MnOOH was complete, the heterogeneous-phase reduction reaction began.

The contribution of this second process to the single discharge capacity was very small and manifested itself as a small bump at potentials below −400 mV. The theoretical capacity for the homogeneous-phase reduction was 1110 $Cg^{-1}$. Assuming that this initial electron transfer reaction ends at −300 mV, the mean capacity of the unmodified electrodes was 600 (±77, n=4) $Cg^{-1}$, which was only 54% of the theoretical capacity, where "n" is the number of samples. After the full discharge to −700 mV, 860 (±120, n=4) $Cg^{-1}$ has passed, which was approximately 39% of 2220 $Cg^{-1}$.

Example 4

TiO2-Treated EMD—10% vol/vol Graphite

Referring to FIGS. 8(b) and 9, the discharge capacity decreased by about a third when $TiO_2$ replaced 15% vol/vol of EMD in the electrode (FIG. 8(b)). $TiO_2$ is an insulator, so inclusion of this material into the admixture caused the average EMD particle to have less surface area in direct contact with the graphite. Reduction was possible only at the EMD-graphite contact locations, so the reduction was less efficient. Control electrodes containing $TiO_2$ released only 28% of the $2e/2H^+$ theoretical capacity. The general shape of the discharge curve was the same as that for the untreated EMD.

Example 5

$SmCo_5$-Treated EMD—10% vol/vol Graphite

Referring to FIGS. 8(c) and 9, the mean rest potential of the $SmCo_5$-treated electrodes was 176 (±3, n=3) mV, 66 (±4) mV less than that for the untreated electrodes. These electrodes delivered more charge than the untreated electrode (confidence interval (C.I.)=95%, $n_1+n_2-2=5$), where "$n_1$" is the number of samples in the first set and "$n_2$" is the number of samples in the second set. The extra charge evolved from a more active heterogeneous-phase reduction and contributed about 400 $Cg^{-1}$ to the total discharge capacity. The average capacity at −300 mV was 709 (±27) $Cg^{-1}$, approximately 64% of the theoretical capacity for the 1 $e/1H^+$ reaction. The end capacity was 1,130 (±50) $Cg^{-1}$, approximately 51% of the $2e/2H^+$ theoretical capacity. Thus, compared to the untreated controls (i.e., no $TiO_2$), the $SmCo_5$-treated EMD electrodes averaged a 131% increase in discharge capacity.

Example 6

$Sm_2Co_{17}$-Treated EMD—10% vol/vol Graphite

Referring to FIGS. 8(d) and 9, results for the $Sm_2Co_{17}$-Treated EMD are depicted. The first discharge curve, which visually appeared much different than the others, was recorded from an electrode containing 10% vol/vol graphite (FIGS. 8(d) and 9). Three separate reduction reactions are represented by the step-like discharge curve. Reduction began at a rest potential of 161 mV, a value lower than that for the $SmCo_5$-treated electrodes. At the onset of electrolysis, the potential dropped approximately 200 mV before stabilizing near −50 mV. At this stage, cell polarization lessened until the homogeneous-phase reduction ended (≈−200 mV). The capacity of this first process was 886 $Cg^{-1}$, approximately 80% of the theoretical capacity. In addition to the first main reduction reaction, two others occurred below −350 mV. These secondary reactions were separated by less than 100 mV, and jointly contributed about half of the total measured capacity. The full discharge capacity at −700 mV is 1,769 $Cg^{-1}$, approximately 80% of the theoretical $2e/2H^+$ capacity.

Example 7

30% vol/vol Graphite

Figure 10B:
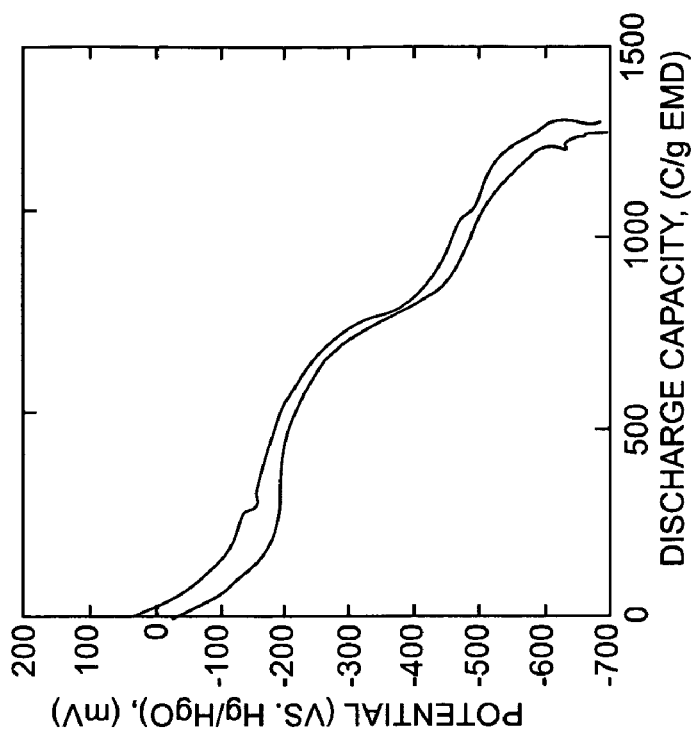
FIGS. 10(a)-(b) are primary discharge curve for electrodes formed with 30% vol/vol graphite: Untreated EMD (a), $Sm_2Co_{17}$-Treated EMD (b).
Figure 10A:
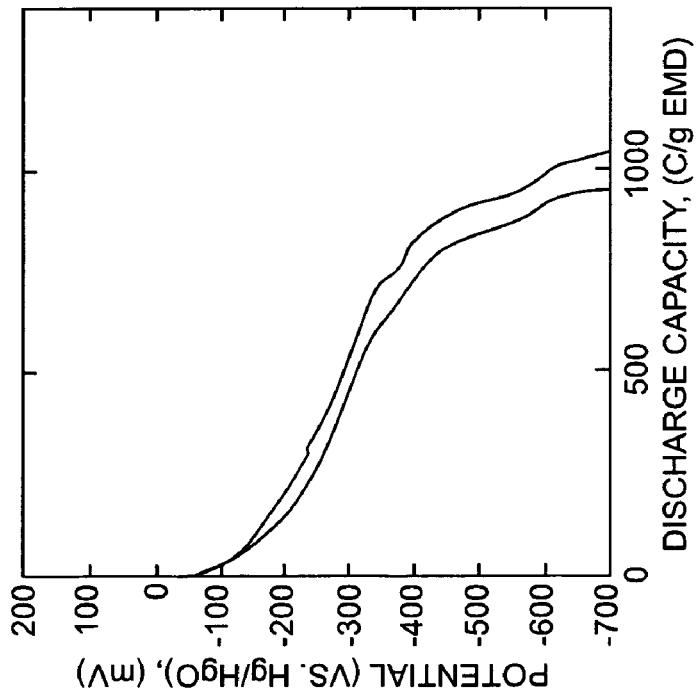

Referring to FIG. 10, for the 30% vol/vol graphite-treated EMD are depicted. Excess graphite in the electrode increased the capacity of the heterogeneous-phase reaction for untreated EMD (FIG. 10(a)). Graphite, the sole electronic conductor in the electrode, was the surface that facilitated the heterogeneous-phase electron transport reaction. Increasing the graphite content is thought to increase the reactive surface area, which increased the total amount of $Mn^{3+}$ that was reduced to $Mn^{2+}$. Increasing the graphite surface area increased the current response, i, for the heterogeneous electron transport. The full $2e/2H^+$ discharge capacity for the untreated EMD was 1000(±50) $Cg^{-1}$.

A similar interpretation seemed to apply to the $Sm_2Co_{17}$-treated electrode with 30% vol/vol graphite (FIG. 10(b)). The heterogeneous electron transfer reaction constituted a larger portion of the discharge capacity. The total discharge capacity for the full $2e/2H^+$ reduction was less than that for the $Sm_2Co_{17}$-treated electrode containing only 10% vol/vol graphite (FIG. 8(d)). The loss in capacity was mainly attributed to a less extant new unknown process. This process appeared as a long "step" at approximately −350 mV for the 10% graphite electrode (FIG. 8(d)), but it was a "wedge" for the 30% graphite electrodes (FIG. 10(b)). Thus, graphite negatively affects the discharge performance of $Sm_2Co_{17}$-treated EMD. The mean total capacity for these electrodes, 1300(±20) $Cg^{-1}$, was significantly greater than that for the untreated electrodes.

Examples 8-11

Cyclic Voltammetry

The samples discussed herein are from the set listed in Table 4. The table category "$Sm_2Co_{17}$-pretreated" refers to samples that contained previously 15% vol/vol $Sm_2Co_{17}$, but contained no magnet particles when tested. The magnetic particles can be removed from the cathode mixture using an external magnet, such as a NdFeB disk or ring magnet. When interpreting the CVs, negative currents are reductions and positive currents are oxidations. This section primarily covers the first reduction wave, which is the bottom half of the graphs (FIG. 11, (a)-(d)). The compositions of the electrodes tested in Examples 15-17 are listed in Table 4.

Example 8

Untreated EMD

Referring to FIG. 11 and Table 7, the current response of EMD to voltammetric perturbation in many ways paralleled the potential response of EMD to application of constant current. In cyclic voltammetry, reduction began when the potential was scanned in the negative direction. The homogeneous-phase $1e/1H^+$ reduction reaction was divided into three separate processes. The first current wave, which marked the reduction of $Mn^{4+}$ in crystal domains at the surface of the EMD particles, occurred at $E_p$≈35 mV (FIG. 11(a) and Table 7, label I).

TABLE 7

Peak Potentials of the Reduction Reactions on the First Discharge. The Roman Numerals Label the Different Reactions.

| | $E_p^c$, (mV) | | | | |
|---|---|---|---|---|---|
| Additive | I | II | III | IV | V |
| none | 35 | −180 | −260 | — | −485 |
| $SmCo_5$ | 35 | −180 | −280 | −410 | −490 |
| $Sm_2Co_{17}$ | 35 | −210 | — | −430 | −510 |
| none, pretreated w/$Sm_2Co_{17}$ | — | — | — | −385 | −540 |

This was a relatively small peak compared to the two peaks immediately following the first peak. Reduction continued in the bulk of the crystal with $Mn^{4+}$ in ramsdellite (process II). This current wave had a maximum near E=−180 mV. A current shoulder on the foot of this wave (E≈−260 mV) corresponded to reduction of $Mn^{4+}$ in pyrolusite domains. Reduction of pyrolusite began at more negative potentials (≈80 mV here) than ramsdellite.

There were not two separate reduction processes for untreated EMD in CCCP experiments. Under constant current conditions, ramsdellite and pyrolusite were likely reduced simultaneously, producing the broad potential characteristic of the first discharge reaction. As in the CCCP experiments, the homogeneous-phase electron transfer reaction was the main reduction process, generating the largest current peaks on the first reduction segment of the CV. Reduction of pyrolusite finished the homogeneous electron transport reaction. Before that stage, however, $Mn^{3+}$ from δ MnOOH began to dissolve in the KOH that permeated the electrode pores. Dissolution continued until the working electrode potential reached approximately −440 mV, which was the potential where heterogeneous electron transfer began. The current wave for this reaction reached its maximum at approximately −485 mV. As in the CCCP experiments on untreated EMD, the signal for this reaction was small compared to the homogeneous-phase reaction.

Example 9

$SmCo_5$-Treated EMD and $Sm_2Co_{17}$-Treated EMD

Figure 12:
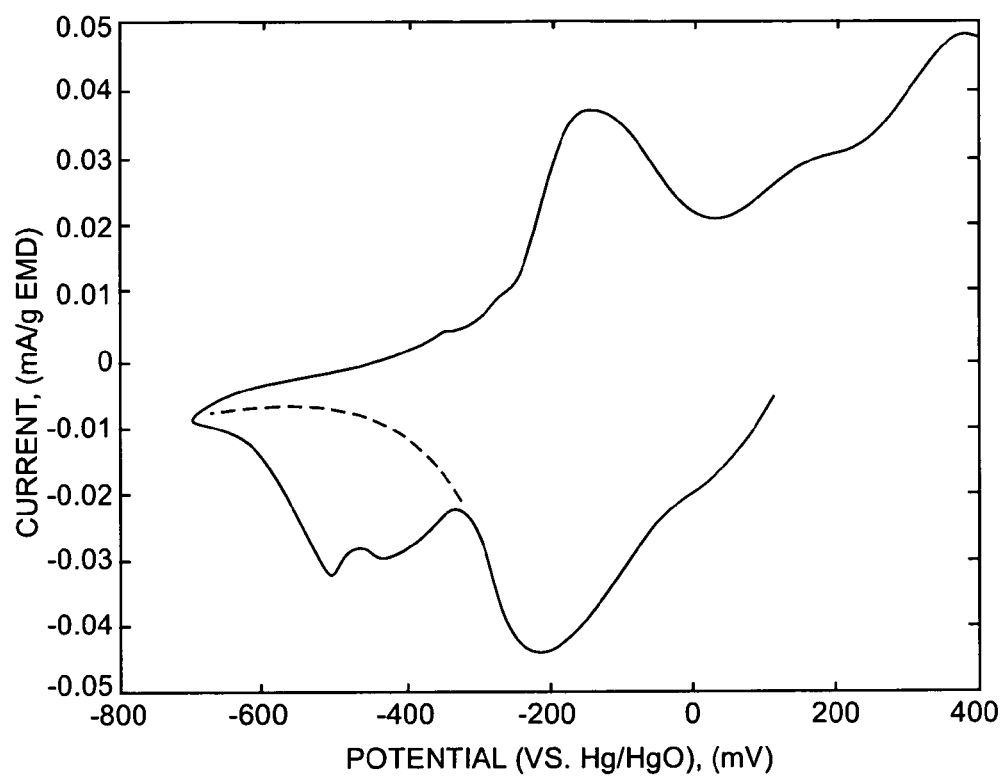
FIG. 12 is a CV plot for $Sm_2Co_{17}$-Treated EMD used for relative height determination, wherein the projected ramsdellite decay current from which peak heights are measured is depicted as a broken line.
Figure 13:
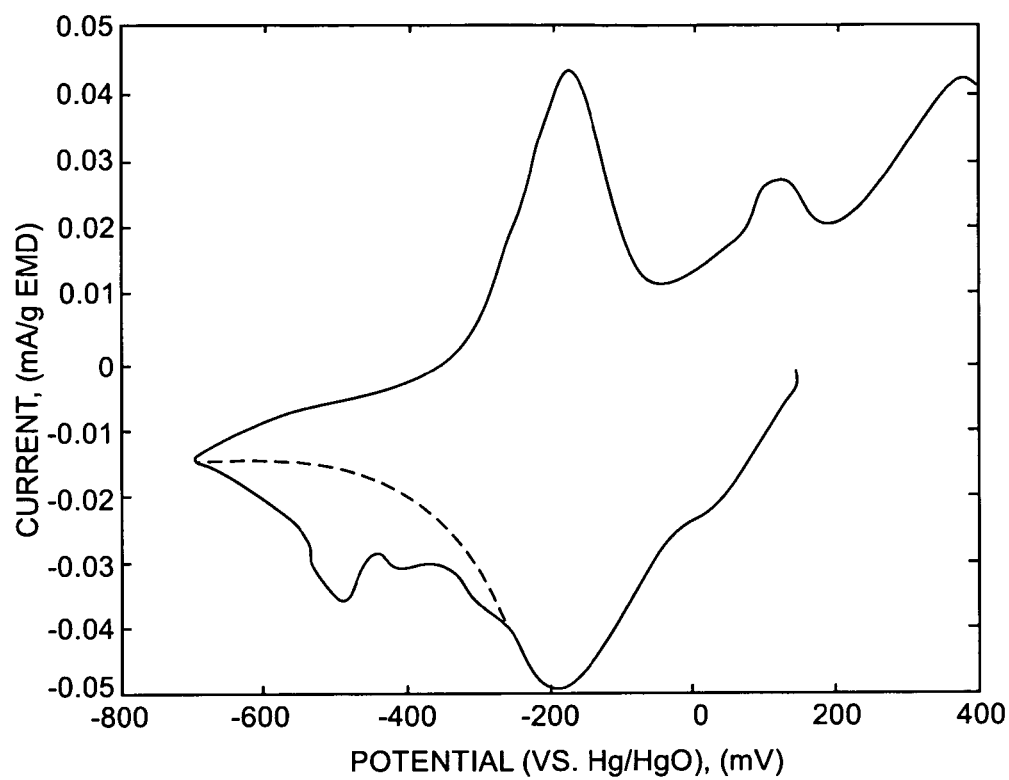
FIG. 13 is a CV plot for $SmCo_5$-Treated EMD used for relative height determination, wherein the projected ramsdellite decay current from which peak heights are measured is depicted as a broken line.

Referring to FIG. 11(b), $SmCo_5$-treated electrodes exhibited a slightly different first reduction segment than untreated EMD. The differences in the voltammetric response were the diminution of the pyrolusite peak (process III in Table 7) and the growth of a new peak near −410 mV. The difference was more striking with the $Sm_2Co_{17}$-treated EMD. The "expected" pyrolusite peak had vanished and the new peak at −430 mV was large. Referring to FIGS. 12 and 13, the relative intensities were estimated for the magnetically treated EMD voltammograms by measuring the distance, in cm, between the projected decay line and the current peak maxima. The results (Table 8) indicated that the ratio $$\frac{d_{new} + d_{pyrolusite}}{d_{het}}$$

was roughly the same for the two electrode types, wherein "d" represents peak magnitudes obtained from distance measurements for pyrolusite, new, and heterogeneous reactions.

TABLE 8

Relative Peak Magnitudes Obtained from Distance Measurements on Scaled CVs.
Height of Process, (cm)

| Additive | Pyrolusite | New | Heterogeneous Phase Reduction | $\frac{d_{new} + d_{pyrolusite}}{d_{het}}$ |
| --- | --- | --- | --- | --- |
| $SmCo_5$ | 0.6 | 1.45 | 2.45 | 0.84 |
| $Sm_2Co_{17}$ | — | 2.5 | 3.0 | 0.83 |

Thus, it appeared that the magnitudes of the pyrolusite peak and the new peak were related by addition. In other words, inhibition of one reduction process strengthened the other.

The CVs of the three electrode types complimented the CCCP data well. Referring to FIG. 9(d), the three separate reduction processes for $Sm_2Co_{17}$-treated EMD were manifested as potential "steps" in the discharge curves. The first step lied above −200 mV, the second near −400 mV, and the third near −500 mV. These steps were translated into distinct current waves in the CV.

The relative peak sizes of the homogeneous-phase reaction and the new/heterogeneous-phase reaction were about the same for the $Sm_2Co_{17}$-treated EMD. The contributions of these separate processes to the total discharge capacity were nearly equal in the discharge curve. This was not observed for either the $SmCo_5$-treated EMD or the untreated EMD, as is reflected in their CVs (FIGS. 9(a) and 9(c)). In these materials, the majority of the charge was withdrawn from the homogeneous-phase electron transfer reaction.

Example 10

$Sm_2Co_{17}$-Pretreated EMD

Referring to FIG. 11(d), the removal of the $Sm_2Co_{17}$ microparticles (after >3 days of mixing) from the composite admixture caused an interesting current-potential response. Almost no current flowed in the potential region where the homogeneous-phase reduction was known to occur. Instead, a very broad reduction wave was observed at Peak Potential "$E_p$"≈−385 mV, followed by a small shoulder at −540 mV. This CV was characteristic of synthetic β-$MnO_2$ (pyrolusite).

Example 11

Blank Electrodes

Figure 14B:
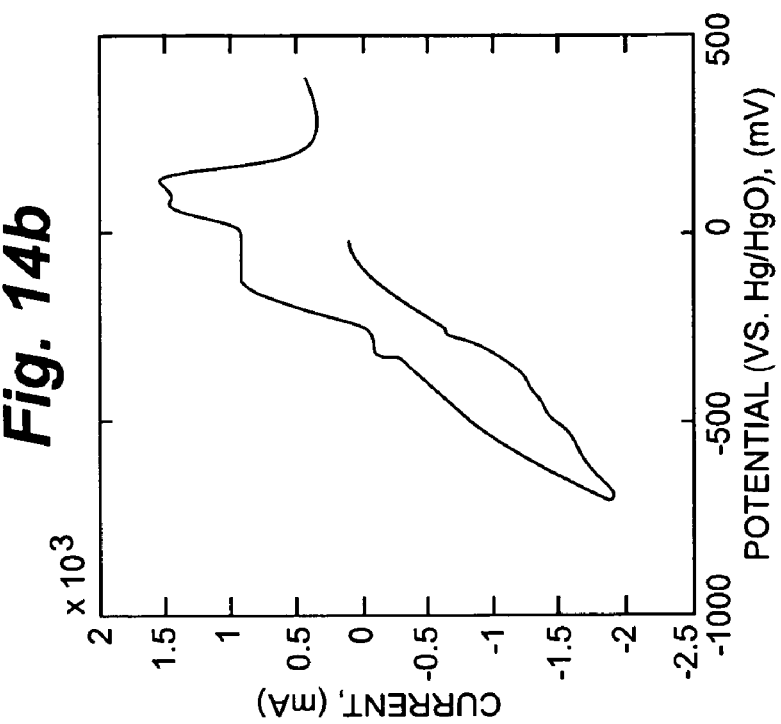
FIGS. 14(a)-(b) are CV plots for (a) an Untreated Blank Electrode and (b) a $Sm_2Co_{17}$-Treated Blank Electrode.
Figure 14A:
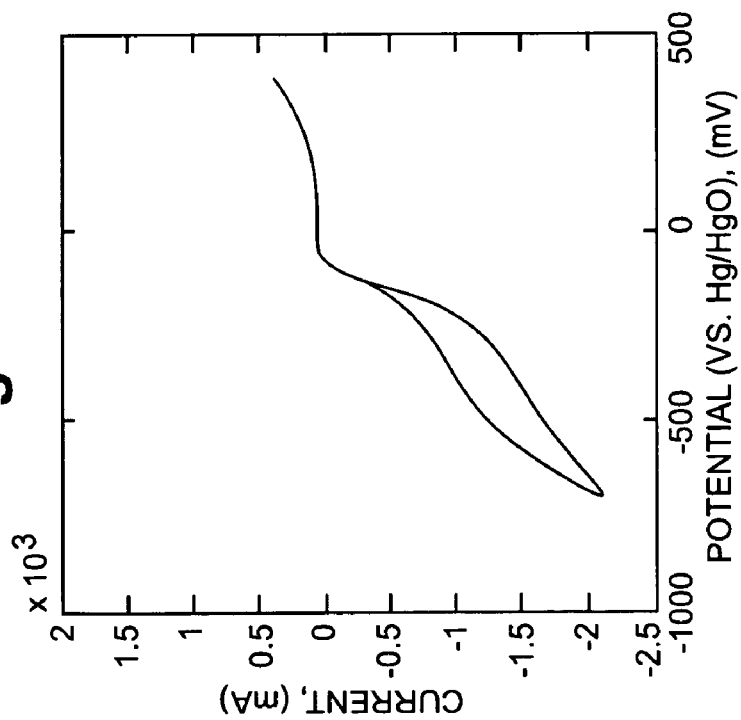

Referring to FIG. 14, the CVs of the blank electrodes exhibited no major differences in the reduction segment, but the blank containing $Sm_2Co_{17}$ exhibits four oxidation waves. Blank electrodes contained synthetic graphite and PTFE, but of the blank electrodes contained EMD.

Thus, although $Sm_2Co_{17}$ was not reduced, it could be oxidized. $MnO_2$, a relatively strong oxidant, can oxidize samarium cobalt prior to electrochemical testing. There was no new reduction process between −400 mV and −500 mV for the blank containing $Sm_2Co_{17}$. Thus, the new unknown process observed in the magnetically-treated cathodes was due to the reduction of a manganese oxide compound.

Example 12

Magnetic Susceptibility

Samarium cobalt-treated EMD performed better than untreated EMD on primary discharge. The molar magnetic susceptibility "$\chi_m$" of EMD increased upon reduction because the number of unpaired 3d electrons increased. If the EMD was oxidizing the samarium cobalt during the mixing step of sample preparation, then χm would increase and the cell potential would decrease. Therefore, a simple measurement to test whether the EMD is reduced prior to electrochemical testing is magnetic susceptibility.

The samples tested contained only EMD and graphite (no PTFE). Referring to Tables 5 and 4, respectively, the EMD and graphite loadings imitated those in samples used for electrochemical testing. The molar susceptibilities of untreated and SmCo5-pretreated EMD are illustrated in Table 9.

TABLE 9

Molar Susceptibilities for Untreated and SmCo$_5$-Treated EMD.

| Sample | $X_m \times 20^{-6}$, (cm$^3$mol$^{-1}$) | n |
|---|---|---|
| untreated EMD | 2800 (±300) | 4 |
| SmCo$_5$-Pretreated EMD | 1600 (±300) | 4 |

The untreated sample had a significantly larger xm value than the SmCo$_5$-pretreated sample (C.I.=95%, n1+n2−2=6), where "n1" is the number of samples in a first set and "n2" is the number of samples in a second set. The $\chi$m for the SmCo$_5$-pretreated sample was much lower than that for any of the selected manganese oxides. The fact that $\chi$m decreased intimates that the EMD is not reduced by the samarium cobalt. Instead, some other chemical transformation may occur that changes the magnetic susceptibility of the sample.

Example 13

X-Ray Diffraction

Figure 15:
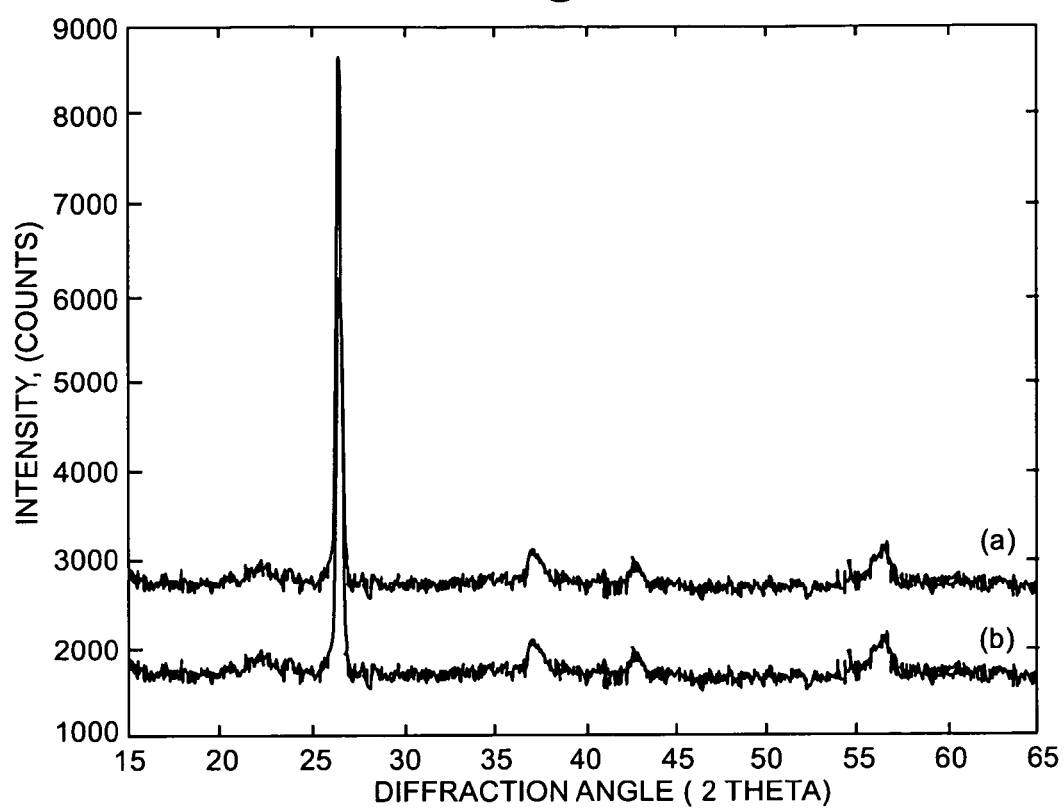
FIG. 15 is an X-ray diffraction patterns for (a) Untreated EMD, (b) $SmCo_5$-Pretreated EMD.

Referring to FIG. 15, collection of the X-ray diffraction patterns followed immediately after the $\chi_m$ measurements. Five broad peaks of low intensity made up the diffraction pattern of this particular EMD. The large sharp peak near 2θ=27° was from the graphite in the sample. Apart from the experimental noise, there were no differences between the diffraction patterns of untreated and SmCo$_5$-pretreated EMD. Thus, the crystal structure of the EMD is not altered by the pre-treatment.

Example 14

CCCP Multiple Cycling Reduction to −300 mV

Limiting the reduction to −300 mV ensured that only the homogeneous-phase 1e/1H$^+$ reaction occurred. Referring to FIG. 16, the first 15 discharge and charge curves for the Sm$_2$Co$_{17}$-treated electrode are depicted, illustrating that the discharge and charge curves for the Sm$_2$Co$_{17}$-treated electrode were different than those for the untreated EMD.

On the first cycle, the rest potential of the Sm$_2$Co$_{17}$-treated EMD was lower than that for the untreated EMD, but cell polarization was also less. The potential for this MTC did not slope as steeply as it did for the untreated EMD. At the end of the reaction, which was reduction of ramsdellite, the potential decreased rapidly until it reached −300 mV. The discharge capacity of the first reduction for the Sm$_2$Co$_{17}$-treated EMD was 606 Cg$^{-1}$.

Reduction of ramsdellite and pyrolusite continued as the working electrode potential steadily slopes downwardly to −300 mV. At that point, some pyrolusite had been reduced. The charge evolved was only 517 Cg$^{-1}$. Capacity losses occurred in both types of electrodes with cycling. However, the Sm$_2$Co$_{17}$-treated EMD could be recycled more effectively than the untreated EMD.

Figure 17:
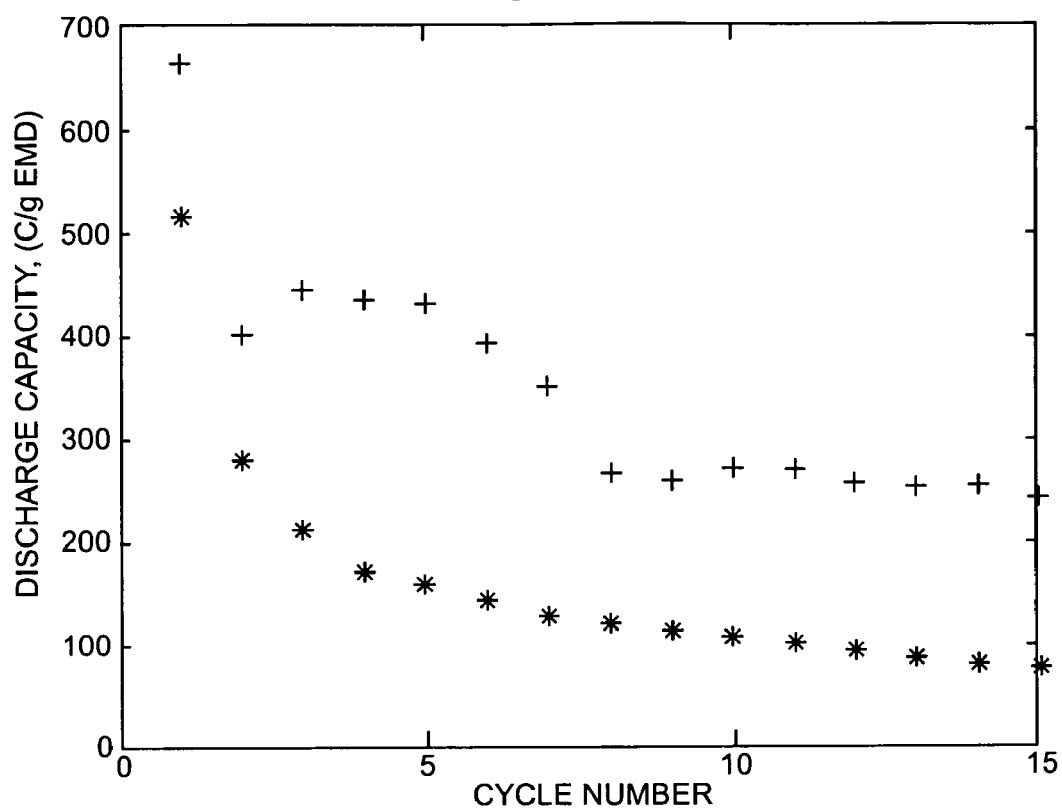
FIG. 17 is a plot depicting end discharge capacities per cycle for $Sm_2Co_{17}$-Treated EMD (+) and Untreated EMD (*), wherein the cells were discharged to −300 mV.
Figure 19:
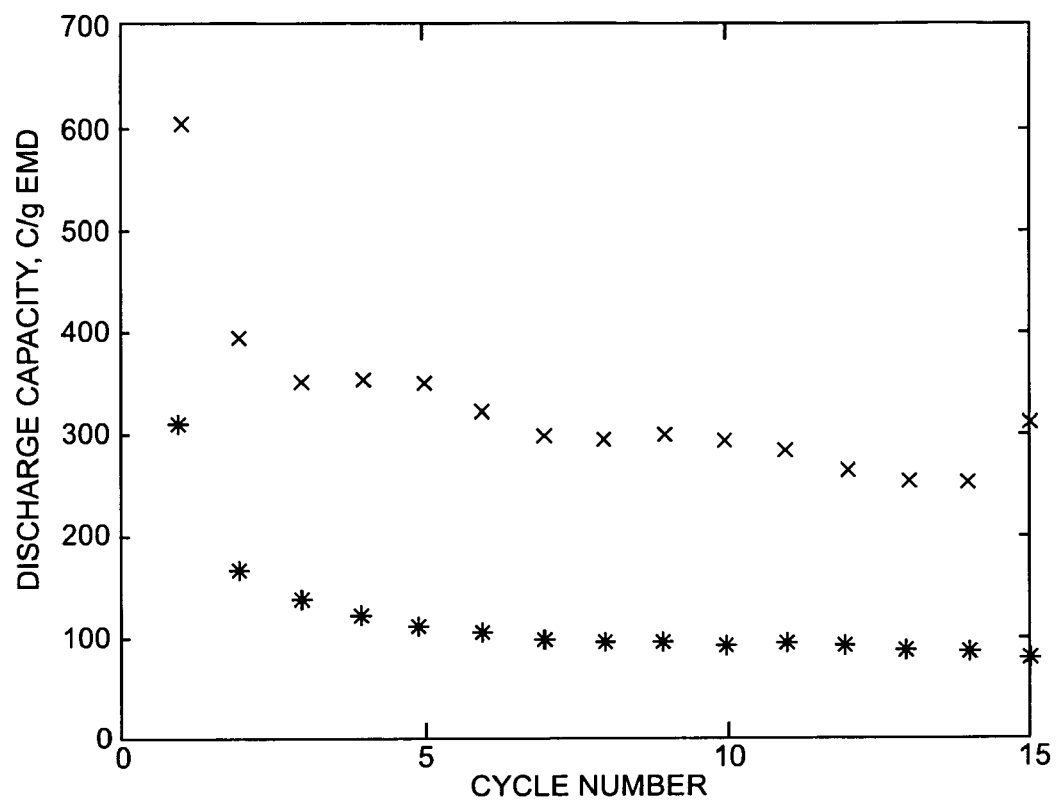
FIG. 19 is a plot depicting discharge capacities per cycle for $Sm_2Co_{17}$-Treated EMD (+) and $TiO_2$-Treated EMD (*), wherein the cells were discharged to −300 mV.

Referring to FIGS. 16(c) and 16(d), the charge segments roughly mirrored the discharge segments from the second to the 15th cycle. The charging took longer for the MTC, but it was evident that the energy added to the system had been converted to material more capable of doing work. The untreated EMD easily lost the ability to store charge upon cycling. Referring to FIG. 17, not only did the MTC perform better than the untreated cathode on the first discharge, but it continued to excel in all subsequent discharges. The end capacity for the MTC stabilized near 250 Cg$^{-1}$, whereas that for the untreated cathode plummeted to approximately 75 Cg$^{-1}$. The 250 Cg$^{-1}$ observed for the MTC on cycle 15 was comparable to that for the untreated EMD on cycle two. Referring to Table 10, over the course of the 15 cycles, the MTC released about 2× more charge than the untreated EMD

TABLE 10

Net (1) Discharge and (2) Charge Capacities for Untreated and Sm$_2$Co$_{17}$-Treated Cathodes. Tabulated are the Total Accumulated Capacities of 15 Cycles of Discharge-Charge of the Homogeneous-Phase Reduction.

| | Discharge Capacity, (Cg$^{-1}$ EMD) | Charge Capacity, (Cg$^{-1}$ EMD) |
|---|---|---|
| Untreated Cathode | 2,380 | 2,070 |
| Sm$_2$Co$_{17}$-Treated Cathode | 5,190 | 4,400 |

Referring to FIG. 18 and Table 11, in an identical cyclic-CCCP experiment, the Sm$_2$Co$_{17}$-treated EMD outperformed the TiO$_2$-treated control. Capacities converged after the 15 cycles for both electrode types, but those for the MTC did so near 300 Cg$^{-1}$, approximately 4× more than those for the TiO$_2$-treated cathode.

TABLE 11

Net (1) Discharge and (2) Charge Capacities for TiO$_2$-Treated and Sm$_2$Co$_{17}$-Treated Cathodes. Tabulated are the Total Accumulated Capacities of 15 Cycles of Discharge-Charge of the Homogeneous-Phase Reduction.

| | Discharge Capacity, (Cg$^{-1}$ EMD) | Capacity, Charge (Cg$^{-1}$ EMD) |
|---|---|---|
| TiO$_2$-Treated Cathode | 1,710 | 1,490 |
| Sm$_2$Co$_{17}$-Treated Cathode | 4,880 | 4,390 |

When repetitively cycled between −300 mV and 400 mV, the electrolyte solution supporting the untreated EMD turned golden-brown in color. In addition, the untreated EMD disc electrode lost mass and became disfigured over time. Neither the color change in the KOH solution nor the electrode disfigurement in cyclic-CCCP experiments occurred on Sm$_2$Co$_{17}$-treated EMD.

Both MTCs described in this section delivered about 5,000 Cg$^{-1}$, approximately 4.5× more charge than is theoretically possible on a single discharge through the homogeneous-phase 1e/1H$^+$ reduction. In sharp contrast with the capabilities of the MTCs, the control electrodes averaged approximately 1800 Cg$^{-1}$, which was only approximately 1.6× the theoretical primary discharge capacity.

Example 15

Multiple Cycling Reduction to −700 mV

Irreversible electron transfer destroyed the rechargeability of fully discharged untreated EMD. Mn(OH)$_2$ was responsible for the irreversible behavior. First, Mn(OH)2 precipitated on the electrode surface and formed an insulating layer that prohibited further heterogeneous electron transfer. Second, oxidation of the Mn$^{2+}$ in equilibrium with Mn(OH)$_2$ did not form δ-MnOOH, but instead formed other Mn(III) compounds. Further oxidation of these Mn(III) compounds yielded δ-MnO$_2$, the performance of which was inferior to that of γ-MnO$_2$.

Figure 22:
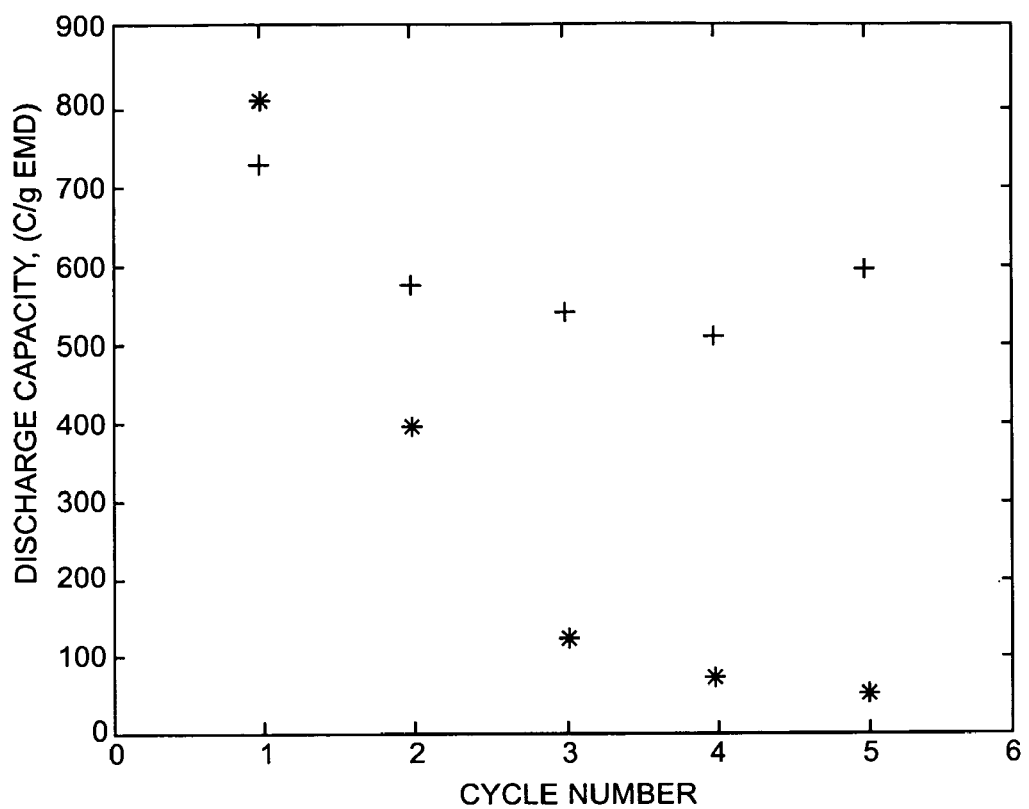
FIG. 22 is a plot depicting mean end discharge capacities of 5 cycles to −700 mV for $Sm_2Co_{17}$-Treated EMD (+) and Untreated EMD (*).
Figure 23A:
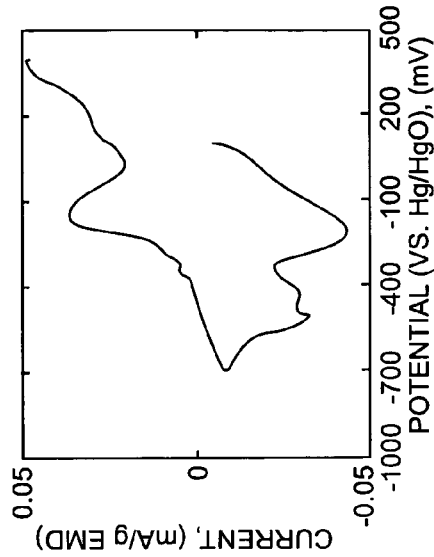
FIGS. 23(a)-(d) are first and second cycle CVs for Untreated EMD (a, c) and $Sm_2Co_{17}$-Treated EMD (b, d).
Figure 23B:
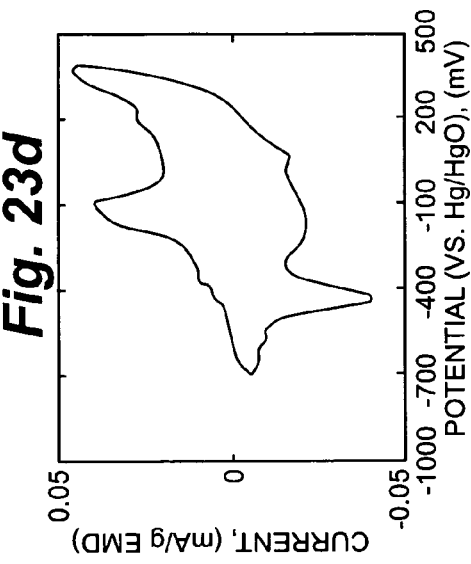
Figure 23C:
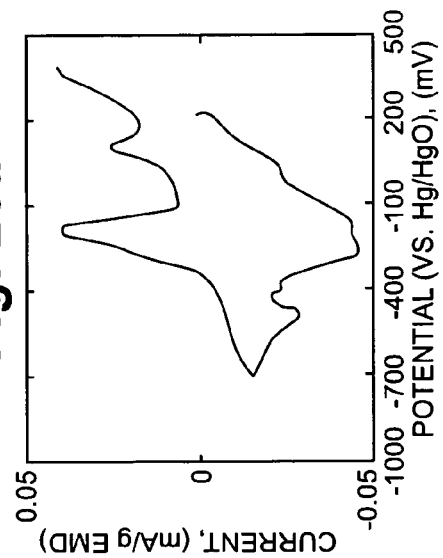
Figure 23D:
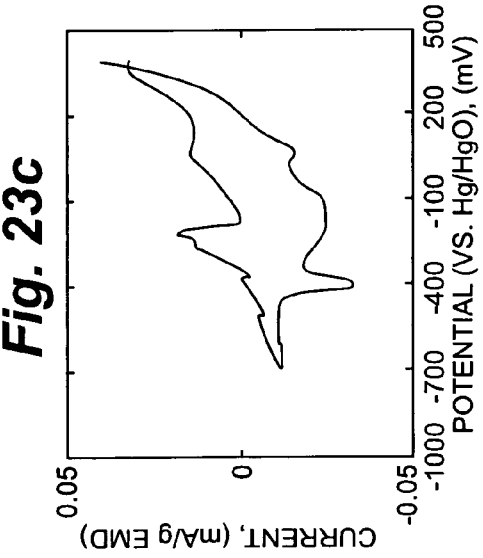

For untreated EMD, the discharge capacity rapidly declined on cycling. Cyclic-CCCP experiments to E=−700 mV unveiled the rechargeable characteristics of the MTCs. Referring to FIG. 20, $Sm_2Co_{17}$-treated EMD maintained approximately 80% of the capacity between the first and second cycles. Referring to FIG. 22, further capacity losses were less after the second cycle. Referring to FIG. 11, cycling of the untreated EMD to −700 mV resulted in severe diminishment of capacity. These electrodes averaged less than 50 $Cg^{-1}$ on the fifth discharge segment, a value less than 10% of that measured for the MTCs. Referring to Table 12, $Sm_2Co_{17}$-treated EMD delivered 1500 (±200) $Cg^{-1}$ more than did the untreated EMD.

TABLE 12

Net Discharge Capacities for Untreated EMD and $Sm_2Co_{17}$-Treated EMD.

|  | Mean Discharge Capacity, ($Cg^{-1}$) |
| --- | --- |
| Untreated EMD | 1400 (±200), n = 2 |
| $Sm_2Co_{17}$-Treated EMD | 2,930 (±90), n = 2 |

There was not a color change in the KOH electrolyte of either electrode type on cycling between 400 mV and −700 mV. The absence of this phenomenon for the untreated EMD was a consequence of heterogeneous electron transfer at lower potentials. Reduction to only −300 mV prevented the occurrence of this reaction, thus resulting in the accumulation of soluble $Mn^{3+}$. When reduced to −700 mV, however, $Mn^{3+}$ was reduced to $Mn^{2+}$ that precipitated to $Mn(OH)_2$. Thus, the heterogeneous-phase mechanism limited the opportunity for $Mn^{3+}$ to accumulate. As a result, the solution color does not change.

Example 16

Cyclic Voltammetry First Oxidation

Referring to FIG. 23, after the first reduction to −700 mV, the potential swept in the positive direction to drive oxidation of the reduction products. Referring to FIG. 23(a), for untreated EMD, the first reaction created a large oxidation current peak, the maximum of which was located at approximately −180 mV. The asymmetry of this wave suggested that two reactions occurred between −340 mV and −100 mV. Another oxidation current peak developed at higher potentials ($E_p \approx 100$ mV), resulting from the formation of $\gamma$-$MnO_2$. Finally, at potentials greater than 250 mV, $\alpha$-MnOOH oxidized to $\gamma$-$MnO_2$. Referring to FIG. 23(b), the first oxidation of $Sm_2Co_{17}$-treated EMD initially yielded a small current peak near −350 mV, followed by a broad signal between −230 mV and 0 mV. In contrast to the untreated sample, magnetic treatment did not favor the formation of $\delta$-$MnO_2$. Instead, the oxidation to $\gamma$-$MnO_2$ created a large current response.

Second Reduction

Figure 24:
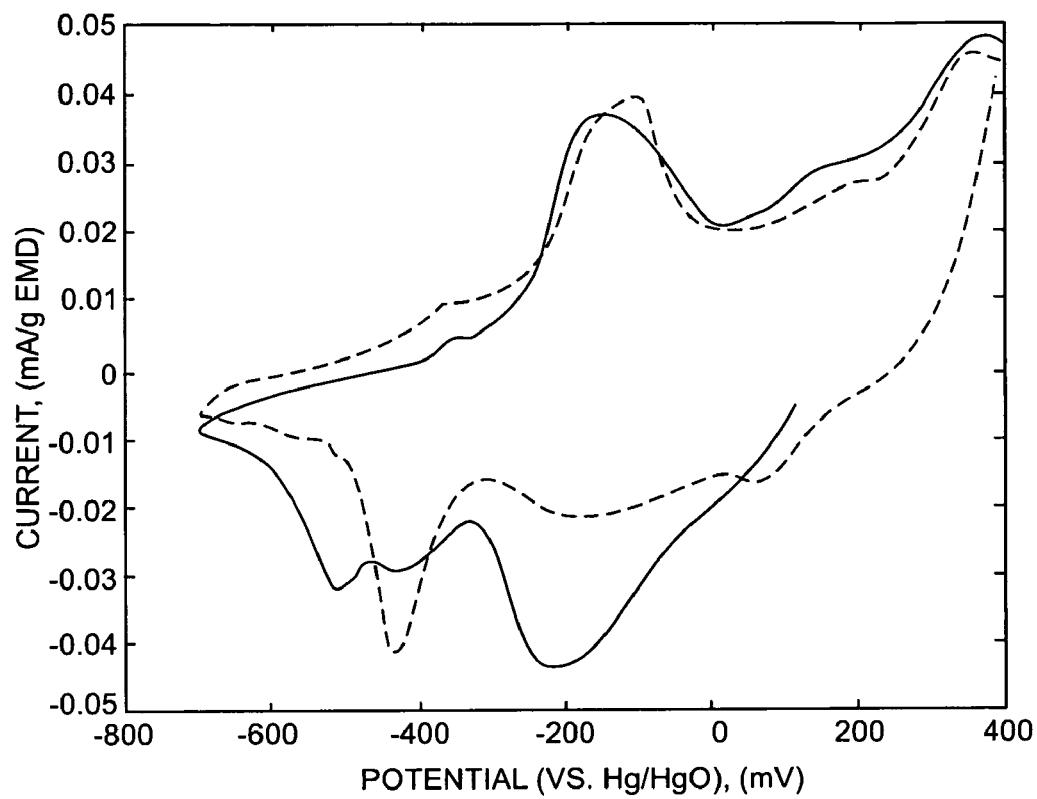
FIG. 24 is a first cycle (solid line) and second cycle (broken line) CV plot for $Sm_2Co_{17}$-Treated EMD.

Referring to FIGS. 15(c) and 15(d), surface reduction of $Mn^{4+}$ occurred for both samples at 70 mV on 57 the second reduction. It was difficult to identify any differences between the reduction waves between 0 mV and −300 mV. For untreated EMD, $\delta$-$MnO_2$ reduced to $Mn_3O_4$ at $E_p \approx -400$ mV. The capacity of $Mn_3O_4$ formation was not large. The CV of $Sm_2Co_{17}$-treated EMD on second reduction exhibited a large current peak at $E_p \approx -435$ mV. Referring to FIG. 24, this reduction wave crested at the same potential as did the unknown peak on the first reduction of $Sm_2Co_{17}$-treated EMD. $Mn(OH)_2$ did not form for either electrode above −700 mV.

Second Oxidation

In general, oxidation peaks developed in the same locations as they did on the first cycle for untreated EMD. Two oxidation peaks were clearly resolved at −260 mV and −215 mV. However, because $Mn(OH)_2$ did not form on the second reduction, the peaks are small. $Mn_3O_4$ cannot be oxidized and can only be reduced to $Mn(OH)_2$. $Mn(OH)_2$ did not form on the second reduction to −700 mV, so only oxidation of residual $Mn(OH)_2$ that formed on the first reduction was possible. The lack of Mn3+ compounds (i.e., $\gamma$-$Mn_2O_3$, $\gamma$-MnOOH, and $\beta$-MnOOH) formed prevented the subsequent oxidation to $\delta$-$MnO_2$. Only a small oxidation peak at 60 mV occurred for this process. The current response corresponding to reversible oxidation to $\gamma$-$MnO_2$ was smaller on the second cycle. In this manner, the capacity of untreated EMD steadily decreased on cycling.

The second oxidation for $Sm_2Co_{17}$-treated EMD appeared the same as the first in terms of both peak positions and magnitudes. The absence of $Mn(OH)_2$ formation on the previous reduction segment did not affect the oxidation process located between −250 mV and 0 mV. Continual potential cycling of $Sm_2Co_{17}$-treated EMD was expected to produce no further significant changes in the voltammetric response, which is consistent with the better rechargeability of $Sm_2Co_{17}$-treated EMD.

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein.

What we claim is:

1. A battery electrode comprising a mixture of manganese dioxide and magnetic particles; wherein said battery electrode comprises between about 25 and about 99 weight percent manganese dioxide, and the magnetic particles retain a stable magnetic moment following the removal of an external magnetic field; wherein the magnetic particles are distributed within the battery electrode in a substantially uniform pattern.

2. The battery electrode of claim 1 further comprising a polymeric binder.

3. The battery electrode of claim 2 wherein the polymeric binder is selected from the group consisting of: polytetrafluoroethylene, polyethylene oxide, and any combinations thereof.

4. The battery electrode of claim 1 comprising between about 0.5 and about 50 weight percent magnetic particles.

5. The battery electrode of claim 1 comprising between about 1 and about 35 weight percent magnetic particles.

6. The battery electrode of claim 1 wherein the magnetic particles are selected from the group consisting of: $Sm_2Co_{17}$, $SMCo_5$, NdFeB, $Sm_2Co_7$, $La_{0.9}Sm_{0.1}Ni_2Co_3$, $Ti_{0.51}Zr_{0.49}V_{0.70}Ni_{1.18}Cr_{0.12}$, $Fe_3O_4$, $Fe_2O_3$, and any combinations thereof.

7. The battery electrode of claim 1 further comprising electrically conductive particles.

8. The battery electrode of claim 7 wherein the electrically conductive particles are selected from the group consisting of: graphite, carbon black, metal powders, and any combinations thereof.

9. The battery electrode of claim 7 comprising between about 1 and about 35 weight percent electrically conductive particles.

10. The battery electrode of claim 7 comprising between about 2 and about 15 weight percent electrically conductive particles.

11. The battery electrode of claim 1 wherein the manganese dioxide comprises electrolytic manganese dioxide.

12. The battery electrode of claim 1 having a first cycle discharge capacity of a 2e/2H+ reduction that is at least 1.2 times that for a comparable electrode not comprising magnetic material.

13. A battery comprising a negative electrode, a positive electrode, a separator intermediate the negative electrode and the positive electrode, and an electrolyte in contact with the electrodes, wherein the positive electrode comprises a mixture of manganese dioxide and magnetic particles; wherein said battery electrode comprises between about 25 and about 99 weight percent manganese dioxide, and the magnetic particles retain a stable magnetic moment following the removal of an external magnetic field, wherein the magnetic particles are distributed within the positive electrode in a substantially uniform pattern.

14. The battery of claim 13 wherein the negative electrode comprises elemental zinc.

15. The battery of claim 14 wherein the elemental zinc comprises a zinc alloy.

16. The battery of claim 14 wherein the elemental zinc comprises a powder bound with a polymer gelling agent.

17. The battery of claim 13 wherein the electrolyte comprises a composition selected from the group consisting of: potassium hydroxide, ammonium chloride, and zinc chloride.

18. The battery of claim 13 wherein the separator comprises a porous sheet.

19. The battery of claim 18 wherein the sheet is selected from the group consisting of: a paper, a polymer, and an ion conducting polymer.

20. The battery of claim 13 further comprising a sealed case wherein the electrodes, separator and electrolyte are within the sealed case.

21. An electrode comprising at least about 50 weight percent manganese dioxide, wherein the electrode in contact with an alkaline electrolyte comprise a specific discharge capacity at a tenth cycle of at least about 250 coulombs per gram discharged to −300 mV measured relative to a Hg/HgO standard, and wherein the electrode further comprises magnetic particles that are distributed throughout the electrode in a substantially uniform pattern.

22. A method for forming a battery electrode comprising combining a mixture of manganese dioxide particles and magnetic particles to form a mixture and compressing said mixture; wherein
the magnetic particles retain a stable magnetic moment following the removal of an external magnetic field, wherein the magnetic particles are distributed within the battery electrode in a substantially uniform pattern.

23. The method of claim 22 further comprising combining the manganese dioxide particles and magnetic particles with a binder.

24. A manganese dioxide cell comprising:
(i) a cathode comprising a mixture of manganese dioxide and magnetic particles, wherein said cathode comprises between about 25 and about 99 weight percent manganese dioxide, and the magnetic particles retain a stable magnetic moment following the removal of an external magnetic field, and wherein the magnetic particles are distributed within the cathode in a substantially uniform pattern;
(ii) an anode; and
(iii) an aqueous alkaline electrolyte, wherein the cathode has a specific discharge capacity of at least about 1150 $Cg^{-1}$ until a potential of the cathode reaches −700 mV relative to a Hg/HgO standard.

25. The cell of claim 24, wherein the specific discharge capacity is evaluated at a discharge rate of 331/3 $mAg^{-1}$.

26. The cell of claim 24, wherein the cathode has a specific discharge capacity of at least about 1300 $Cg^{-1}$ until a potential of the cathode reaches −700 mV relative to a Hg/HgO standard.

27. A manganese dioxide cell comprising a cathode comprising magnetized manganese dioxide, an anode, a separator between the anode and the cathode and electrolyte in contact with the electrodes, wherein said cathode comprises between about 25 and about 79 weight percent manganese dioxide, wherein the cathode electrode of the cell comprises magnetic particles that are distributed throughout the electrode in a substantially uniform pattern.

28. The battery electrode of claim 1, wherein said battery electrode comprises between about 25 and about 73.31 weight percent of manganese dioxide.

29. The battery electrode of claim 1, wherein the magnetic particles are selected from the group consisting of: $Sm_2Co_{17}$ and $SmCo_5$.

* * * * *